United States Patent
Cendak et al.

(10) Patent No.: US 7,811,965 B2
(45) Date of Patent: *Oct. 12, 2010

(54) PLATINUM-COPPER-NICKEL FUEL CELL CATALYST

(75) Inventors: Keith James Cendak, San Mateo, CA (US); Alexander Gorer, San Jose, CA (US); Peter Strasser, Houston, TX (US); Martin Devenney, Mountain View, CA (US); Qun Fan, Fremont, CA (US); Konstantinos Chondroudis, Thessaloniki (GR); Daniel M. Giaquinta, Mountain View, CA (US); Kenta Urata, Utsunomiya (JP); Hiroyuki Oyanagi, Utsunomiya (JP)

(73) Assignees: Symyx Solutions, Inc., Sunnyvale, CA (US); Honda Giken Kogyo Kabushiki Kaisha, Tokyo (JP)

(*) Notice: Subject to any disclaimer, the term of this patent is extended or adjusted under 35 U.S.C. 154(b) by 1050 days.

This patent is subject to a terminal disclaimer.

(21) Appl. No.: 11/205,557

(22) Filed: Aug. 17, 2005

(65) Prior Publication Data

US 2006/0058185 A1    Mar. 16, 2006

Related U.S. Application Data

(60) Provisional application No. 60/602,459, filed on Aug. 18, 2004.

(51) Int. Cl.
    *B01J 23/00* (2006.01)
    *B01J 23/40* (2006.01)
    *B01J 23/42* (2006.01)
    *B01J 23/44* (2006.01)
    *C22C 5/04* (2006.01)

(52) U.S. Cl. ............ 502/326; 502/337; 502/339; 420/468

(58) Field of Classification Search ........ 502/326, 502/337, 339; 420/468
    See application file for complete search history.

(56) References Cited

U.S. PATENT DOCUMENTS

| 2,622,050 | A | * | 12/1952 | Martin et al. | 148/102 |
| 3,591,373 | A | * | 7/1971 | Zhimizu et al. | 420/466 |
| 3,689,254 | A | * | 9/1972 | Inoue et al. | 420/468 |
| 3,701,687 | A | | 10/1972 | Grubb et al. | |
| 3,759,823 | A | * | 9/1973 | Davies et al. | 208/138 |
| 3,824,113 | A | * | 7/1974 | Loxley et al. | 427/431 |

(Continued)

FOREIGN PATENT DOCUMENTS

EP    0355853 A2    2/1990

(Continued)

OTHER PUBLICATIONS

Chu et al., J. Electrochem. Soc. 1996, 143, p. 1685.

(Continued)

*Primary Examiner*—Cam N Nguyen
(74) *Attorney, Agent, or Firm*—Senniger Powers LLP

(57) ABSTRACT

A composition for use as a catalyst in, for example, a fuel cell, the composition comprising platinum, copper, and nickel, wherein the concentration of platinum therein is greater than 50 atomic percent and less than 80 atomic percent, and further wherein the sum of the concentrations of platinum, copper and nickel is greater than 95 atomic percent.

20 Claims, 3 Drawing Sheets

U.S. PATENT DOCUMENTS

| | | | |
|---|---|---|---|
| 3,860,458 A * | 1/1975 | Inoue et al. | 148/120 |
| 3,915,898 A * | 10/1975 | Acres et al. | 502/315 |
| 4,061,495 A | 12/1977 | Selman et al. | |
| 4,261,742 A | 4/1981 | Coupland et al. | |
| 4,716,087 A | 12/1987 | Ito et al. | |
| 4,717,774 A * | 1/1988 | Narayan et al. | 564/422 |
| 4,781,803 A | 11/1988 | Harris et al. | |
| 4,806,515 A * | 2/1989 | Luczak et al. | 502/185 |
| 4,812,434 A | 3/1989 | Polhmann et al. | |
| 4,885,376 A | 12/1989 | Verkade | |
| 4,954,474 A | 9/1990 | Tsurumi et al. | |
| 4,970,128 A * | 11/1990 | Itoh et al. | 429/42 |
| 4,985,386 A | 1/1991 | Tsurumi et al. | |
| 5,024,905 A | 6/1991 | Itoh et al. | |
| 5,068,161 A | 11/1991 | Keck et al. | |
| 5,079,107 A | 1/1992 | Jalan | |
| 5,096,866 A | 3/1992 | Itoh et al. | |
| 5,126,216 A * | 6/1992 | Capuano et al. | 429/42 |
| 5,178,971 A | 1/1993 | Itoh et al. | |
| 5,189,005 A | 2/1993 | Watanabe et al. | |
| 5,225,391 A | 7/1993 | Stonehart et al. | |
| 5,246,791 A | 9/1993 | Fisher et al. | |
| 5,593,934 A | 1/1997 | Stonehart | |
| 5,594,933 A * | 1/1997 | Hayashi et al. | 428/546 |
| 5,635,439 A | 6/1997 | Fukui et al. | |
| 5,767,036 A * | 6/1998 | Freund et al. | 502/185 |
| 5,876,867 A | 3/1999 | Itoh et al. | |
| 5,939,220 A | 8/1999 | Gunner et al. | |
| 6,045,671 A | 4/2000 | Wu et al. | |
| 6,048,633 A | 4/2000 | Fujii et al. | |
| 6,127,058 A | 10/2000 | Pratt et al. | |
| 6,171,721 B1 | 1/2001 | Narayanan et al. | |
| 6,183,894 B1 | 2/2001 | Adzic et al. | |
| 6,187,164 B1 | 2/2001 | Warren et al. | |
| 6,187,468 B1 | 2/2001 | Shinkai et al. | |
| 6,225,011 B1 | 5/2001 | Gotoh et al. | |
| 6,268,077 B1 | 7/2001 | Kelley et al. | |
| 6,294,280 B1 | 9/2001 | Tanaka et al. | |
| 6,309,758 B1 * | 10/2001 | Schmidt | 428/570 |
| 6,638,372 B1 * | 10/2003 | Abrams et al. | 148/402 |
| 6,730,350 B2 | 5/2004 | Finkelshtain et al. | |
| 2002/0009626 A1 | 1/2002 | Terazono et al. | |
| 2002/0147103 A1 | 10/2002 | Ruettinger et al. | |
| 2003/0008196 A1 | 1/2003 | Wessel et al. | |
| 2003/0045425 A1 | 3/2003 | Ruth et al. | |
| 2003/0059666 A1 | 3/2003 | Kourtakis | |
| 2006/0251952 A1 * | 11/2006 | Chondroudis et al. | 429/44 |

FOREIGN PATENT DOCUMENTS

| | | |
|---|---|---|
| EP | 0386764 A2 | 9/1990 |
| EP | 0469514 A2 | 9/1992 |
| EP | 0552587 A1 | 7/1993 |
| EP | 0827225 A2 | 3/1998 |
| EP | 0838872 A3 | 4/1998 |
| EP | 0858987 B1 | 8/1998 |
| GB | 1363888 | 8/1974 |
| JP | 03127459 | 5/1991 |
| JP | 6-007679 | 1/1994 |
| JP | 2001-224969 | 8/2001 |
| JP | 2002-289208 | 10/2002 |
| JP | 2003-331855 | 11/2003 |
| WO | WO 99/16137 | 4/1999 |

OTHER PUBLICATIONS

Epron, Influence of Oxidizing and Reducing Treatments on the Metal-Metal Interactions and on the Activity for Nitrate Reduction of a Pt-Cu Bimetallic Catalyst, 2002, pp. 253-261.

Ralph et al., Catalysis for Low Temperature Fuel Cells Part 1: The Cathode Challenges, Platinum Metals Rev., 2002, 46 (1), p. 3-14.

Schmidt et al., Rotating Disk Electrode Measurements on the CO Tolerance of a High-surface Area Pt/Vulcan Carbon Fuel Cell Electrocatalyst, Journal of the Electrochemical Society (1999), 146(4), pp. 1296-1304.

Schmidt et al., Characterization of High Surface-Area Electrocatalysts using a Rotating Disk Electrode Configuration, Journal of the Electrochemical Society (1998), 145(7), pp. 2354-2358.

Strasser et al., Combinatorial Electrochemical Techniques for The Discovery of New Fuel-Cell Cathode Materials, Direct Methanol Fuel Cells, Proceedings of the International Symposium, Electrochemical Society Proceedings vol. 2001-4, Nayayanan, Gottesfeld, and Zawodzinski, eds, New Jersey, 2001, pp. 191-208.

Strasser et al., Combinatorial Electrochemical Techniques for the Discovery of New Fuel-Cell Electrode Materials, Proceedings of the International Symposium on Fuel Cells for Vehicles, 41st Battery Symposium, The Electrochemical Society of Japan, Nagoya 2000, pp. 34-35.

Yasuda et al., Polymerization-Pressure Dependencies of Properties of Perfluorosulfonate Cation-Exchanger Thin Films by Plasma Polymerization, Ber. Bunsenges. Phys. Chem. 98, No. 4, 1994, pp. 631-635.

Unknown Origin, Designing of Active Cathods Catalysts for Polymer Electrolyte Fuel Cells, Energy Phenomena Laboratory, Tokyo Institute of Technology, 2002-2003.

* cited by examiner

PLATINUM-COPPER-NICKEL FUEL CELL CATALYST

CROSS-REFERENCE TO RELATED APPLICATION

This application claims the benefit of U.S. Provisional Application No. 60/602,459, filed Aug. 18, 2004, which is incorporated herein by reference.

BACKGROUND OF THE INVENTION

1. Field of the Invention

The present invention relates to compositions which are useful as catalysts in fuel cell electrodes (e.g., electrocatalysts) and other catalytic structures, and which comprise platinum, copper and nickel.

2. Description of Related Technology

A fuel cell is an electrochemical device for directly converting the chemical energy generated from an oxidation-reduction reaction of a fuel such as hydrogen or hydrocarbon-based fuels and an oxidizer such as oxygen gas (in air) supplied thereto into a low-voltage direct current. Thus, fuel cells chemically combine the molecules of a fuel and an oxidizer without burning, dispensing with the inefficiencies and pollution of traditional combustion.

A fuel cell is generally comprised of a fuel electrode (anode), an oxidizer electrode (cathode), an electrolyte interposed between the electrodes (alkaline or acidic), and means for separately supplying a stream of fuel and a stream of oxidizer to the anode and the cathode, respectively. In operation, fuel supplied to the anode is oxidized, releasing electrons that are conducted via an external circuit to the cathode. At the cathode, the supplied electrons are consumed when the oxidizer is reduced. The current flowing through the external circuit can be made to do useful work.

There are several types of fuel cells, including those having electrolytes of phosphoric acid, molten carbonate, solid oxide, potassium hydroxide, or a proton exchange membrane. A phosphoric acid fuel cell operates at about 160-220° C., and preferably at about 190-200° C. This type of fuel cell is currently being used for multi-megawatt utility power generation and for co-generation systems (i.e., combined heat and power generation) in the 50 to several hundred kilowatts range.

In contrast, proton exchange membrane fuel cells use a solid proton-conducting polymer membrane as the electrolyte. Typically, the polymer membrane is maintained in a hydrated form during operation in order to prevent loss of ionic conduction which limits the operation temperature typically to between about 70 and about 120° C. depending on the operating pressure, and preferably below about 100° C. Proton exchange membrane fuel cells have a much higher power density than liquid electrolyte fuel cells (e.g., phosphoric acid), and can vary output quickly to meet shifts in power demand. Thus, they are suited for applications such as in automobiles and small-scale residential power generation where quick startup is a consideration.

In some applications (e.g., automotive) pure hydrogen gas is the optimum fuel; however, in other applications where a lower operational cost is desirable, a reformed hydrogen-containing gas is an appropriate fuel. A reformed-hydrogen containing gas is produced, for example, by steam-reforming methanol and water at 200-300° C. to a hydrogen-rich fuel gas containing carbon dioxide. Theoretically, the reformate gas consists of 75 vol % hydrogen and 25 vol % carbon dioxide. In practice, however, this gas also contains nitrogen, oxygen and, depending on the degree of purity, varying amounts of carbon monoxide (up to 1 vol %). Although some electronic devices also reform liquid fuel to hydrogen, in some applications the conversion of a liquid fuel directly into electricity is desirable, as then high storage density and system simplicity are combined. In particular, methanol is an especially desirable fuel because it has a high energy density, a low cost, and is produced from renewable resources.

For the oxidation and reduction reactions in a fuel cell to proceed at useful rates, especially at operating temperatures below about 300° C., electrocatalyst materials are typically provided at the electrodes. Initially, fuel cells used electrocatalysts made of a single metal, usually platinum (Pt), palladium (Pd), rhodium (Rh), iridium (Ir), osmium (Os), silver (Ag) or gold (Au), because they are able to withstand the corrosive environment. In general, platinum is considered to be the most efficient and stable single-metal electrocatalyst for fuel cells operating below about 300° C.

While the above-noted elements were first used in fuel cells in metallic powder form, later techniques were developed to disperse these metals over the surface of electrically conductive supports (e.g., carbon black) to increase the surface area of the electrocatalyst. An increase in the surface area of the electrocatalyst in turn increases the number of reactive sites, leading to improved efficiency of the cell. Nevertheless, fuel cell performance typically declines over time because the presence of electrolyte, high temperatures and molecular oxygen dissolve the electrocatalyst and/or sinter the dispersed electrocatalyst by surface migration or dissolution/reprecipitation.

Although platinum is considered to be the most efficient and stable single-metal electrocatalyst for fuel cells, it is costly. Additionally, an increase in electrocatalyst activity over platinum is desirable, if not necessary, for wide-scale commercialization of fuel cell technology. However, the development of cathode fuel cell electrocatalyst materials faces longstanding challenges. The greatest challenge is the improvement of the electrode kinetics of the oxygen reduction reaction. In fact, sluggish electrochemical reaction kinetics has prevented electrocatalysts from attaining the thermodynamic reversible electrode potential for oxygen reduction. This is reflected in exchange current densities of around $10^{-10}$ to $10^{-12}$ A/cm$^2$ for oxygen reduction on, for example, Pt at low and medium temperatures. A factor contributing to this phenomenon includes the fact that the desired reduction of oxygen to water is a four-electron transfer reaction and typically involves breaking a strong O—O bond early in the reaction. In addition, the open circuit voltage is lowered from the thermodynamic potential for oxygen reduction due to the formation of peroxide and possible platinum oxides that inhibit the reaction. A second challenge is the stability of the oxygen electrode (cathode) during long-term operation. Specifically, a fuel cell cathode operates in a regime in which even the most unreactive metals are not completely stable. Thus, alloy compositions that contain non-noble metal elements may have a rate of corrosion that would negatively impact the projected lifetime of a fuel cell. Corrosion may be more severe when the cell is operating near open circuit conditions—the most desirable potential for thermodynamic efficiency.

Electrocatalyst materials at the anode also face challenges during fuel cell operation. Specifically, as the concentration of carbon monoxide (CO) rises above about 10 ppm in the fuel the surface of the electrocatalyst can be rapidly poisoned. As a result, platinum (by itself) is a poor electrocatalyst if the fuel stream contains carbon monoxide (e.g., reformed-hydrogen gas typically exceeds 100 ppm). Liquid hydrocarbon-based fuels (e.g., methanol) present an even greater poisoning problem. Specifically, the surface of the platinum becomes blocked with the adsorbed intermediate, carbon monoxide (CO). It has been reported that $H_2O$ plays a key role in the removal of such poisoning species in accordance with the following reactions:

$$Pt+CH_3OH \rightarrow Pt\text{---}CO+4H^++4e^- \quad (1);$$

$$Pt+H_2O \rightarrow Pt\text{---}OH+H^++e^- \quad (2); \text{ and}$$

$$Pt\text{---}CO+Pt\text{---}OH \rightarrow 2Pt+CO_2+H^++e^- \quad (3).$$

As indicated by the foregoing reactions, the methanol is adsorbed and partially oxidized by platinum on the surface of the electrode (1). Adsorbed OH, from the hydrolysis of water, reacts with the adsorbed CO to produce carbon dioxide and a proton (2,3). However, platinum does not form OH species rapidly at the potentials where fuel cell electrodes operate (e.g., 200 mV-1.5 V). As a result, step (3) is the slowest step in the sequence, limiting the rate of CO removal, thereby allowing poisoning of the electrocatalyst to occur. This applies in particular to a proton exchange membrane fuel cell which is especially sensitive to CO poisoning because of its low operating temperatures.

One approach for improving the cathodic performance of an electrocatalyst during the reduction of oxygen and/or the anodic performance during the oxidation of hydrogen or methanol is to employ an electrocatalyst which is more active, corrosion resistant, and/or more poison tolerant. For example, increased tolerance to CO has been reported by alloying platinum and ruthenium at a 50:50 atomic ratio (see, D. Chu and S. Gillman, J. Electrochem. Soc. 1996, 143, 1685). The electrocatalysts proposed to-date, however, leave room for further improvement.

BRIEF SUMMARY OF THE INVENTION

Briefly, therefore, the present invention is directed to a composition for use as a catalyst in oxidation or reduction reactions, in for example fuel cells, the composition comprising platinum, copper and nickel, wherein the sum of the concentrations of platinum, copper and nickel is greater than 95 atomic percent, and further wherein the concentration of platinum is greater than 50 atomic percent and less than about 80 atomic percent.

The present invention is further directed to a composition for use as a catalyst in oxidation or reduction reactions, in for example fuel cells, the composition comprising platinum, copper and nickel, wherein the sum of the concentrations of platinum, copper and nickel is greater than 95 atomic percent, and further wherein the concentration of copper is greater than 25 atomic percent.

The present invention is still further directed to a composition for use as a catalyst in oxidation or reduction reactions, in for example fuel cells, the composition comprising platinum, copper and nickel, wherein the sum of the concentrations of platinum, copper and nickel is greater than 95 atomic percent, and further wherein the concentration of nickel is less than 25 atomic percent.

The present invention is still further directed to a composition for use as a catalyst in oxidation or reduction reactions, in for example fuel cells, the composition comprising platinum, copper and nickel, wherein (i) the sum of the concentrations of platinum, copper and nickel is greater than 95 atomic percent, (ii) the concentration of copper is less than 25 atomic percent, and (iii) the concentration of nickel is greater than 25 atomic percent.

The present invention is still further directed to a composition for use as a catalyst in oxidation or reduction reactions, in for example fuel cells, the composition comprising platinum, copper and nickel, wherein (i) the sum of the concentrations of platinum, copper and nickel is greater than 95 atomic percent, (ii) the concentration of nickel is less than 25 atomic percent, and (iii) the concentration of copper is greater than 25 atomic percent.

The present invention is still further directed to a composition for use as a catalyst in oxidation or reduction reactions, in for example fuel cells, the composition comprising platinum, copper and nickel, wherein the sum of the concentrations of platinum, copper and nickel is greater than 95 atomic percent, and further wherein (i) the concentration of platinum is greater than about 60 atomic percent and less than about 70 atomic percent, (ii) the concentration of copper is greater than 25 atomic percent and less than about 35 atomic percent; and (iii) the concentration of nickel is greater than about 1 and less than about 15 atomic percent.

The present invention is still further directed to a composition for use as a catalyst in oxidation or reduction reactions, in for example fuel cells, the composition comprising platinum, copper and nickel, wherein the sum of the concentrations of platinum, copper and nickel is greater than 95 atomic percent, and further wherein (i) the concentration of platinum is greater than 50 atomic percent and less than about 80 atomic percent, and (ii) the concentration of nickel is greater than about 1 and less than 25 atomic percent.

The present invention is still further directed to one of the preceding compositions wherein the composition has an observed lattice constant which is less than a lattice constant as calculated in accordance with Vegard's Law.

The present invention is still further directed to one or more of the foregoing catalyst compositions wherein said catalyst composition comprises an alloy of the recited metals, or alternatively wherein said catalyst consists essentially of an alloy of the recited metals.

The present invention is still further directed to a supported electrocatalyst powder for use in electrochemical reactor devices, the supported electrocatalyst powder comprising any of the foregoing catalyst compositions on electrically conductive support particles.

The present invention is still further directed to a fuel cell electrode, the fuel cell electrode comprising electrocatalyst particles and an electrode substrate upon which the electrocatalyst particles are deposited, the electrocatalyst particles comprising any of the foregoing catalyst compositions.

The present invention is still further directed to a fuel cell comprising an anode, a cathode, a proton exchange membrane between the anode and the cathode, and any of the foregoing catalyst compositions, for the catalytic oxidation of a hydrogen-containing fuel or the catalytic reduction of oxygen.

The present invention is still further directed to a method for the electrochemical conversion of a hydrogen-containing fuel and oxygen to reaction products and electricity in a fuel cell comprising an anode, a cathode, a proton exchange membrane therebetween, any of the foregoing catalyst compositions, and an electrically conductive external circuit connecting the anode and cathode. The method comprises contacting the hydrogen-containing fuel or the oxygen and any of the foregoing catalyst compositions to catalytically oxidize the hydrogen-containing fuel or catalytically reduce the oxygen.

The present invention is still further directed to a fuel cell electrolyte membrane, and/or a fuel cell electrode, having deposited on a surface thereof a layer of an unsupported catalyst composition, said unsupported catalyst composition layer comprising any of the foregoing catalyst compositions.

The present invention is still further directed to a method for preparing a catalyst composition from a catalyst precursor composition, said precursor composition comprising platinum, copper and nickel, wherein (a) the sum of the concentrations of platinum, copper and nickel therein is greater 95 atomic percent, and (b) the concentration of platinum therein is less than 45 atomic percent. The method comprises subjecting said precursor composition to conditions sufficient to remove a portion of the copper and/or nickel present therein, such that the resulting catalyst composition comprises platinum, copper and nickel, wherein (c) the sum of the concentrations of platinum, copper and nickel therein is greater than 95 atomic percent, and (d) the concentration of platinum therein is greater than 55 atomic percent.

In one preferred embodiment of the above-noted method, the catalyst precursor composition is contacted with an acidic solution to solubilize a portion of the copper and/or nickel present therein. In an alternative embodiment, this method comprises subjecting the catalyst precursor composition to an electrochemical reaction, wherein for example a hydrogen-containing fuel and oxygen are converted to reaction products and electricity in a fuel cell comprising an anode, a cathode, a proton exchange membrane therebetween, the catalyst precursor composition, and an electrically conductive external circuit connecting the anode and cathode. By contacting the hydrogen-containing fuel or the oxygen and the catalyst precursor composition, the hydrogen-containing fuel is oxidized and/or the oxygen is catalytically reduced. As part of this reaction, copper and/or nickel are dissolved in situ from the catalyst precursor composition.

The present invention is further directed to said catalyst precursor composition; that is, the present invention is further directed to a catalyst precursor composition comprising platinum, copper and nickel, wherein the concentration of platinum in the catalyst composition is less than 45 atomic percent and the sum of the concentrations of platinum, copper and nickel therein is greater than 95 atomic percent. This precursor composition may optionally be supported on an electrically conductive support.

The foregoing, as well as other features and advantages of the present invention, will become more apparent from the following description and accompanying drawings.

BRIEF DESCRIPTION OF THE DRAWINGS

It is to be noted that corresponding reference characters indicate corresponding parts throughout the drawings.

DETAILED DESCRIPTION OF THE INVENTION

Figure 1:
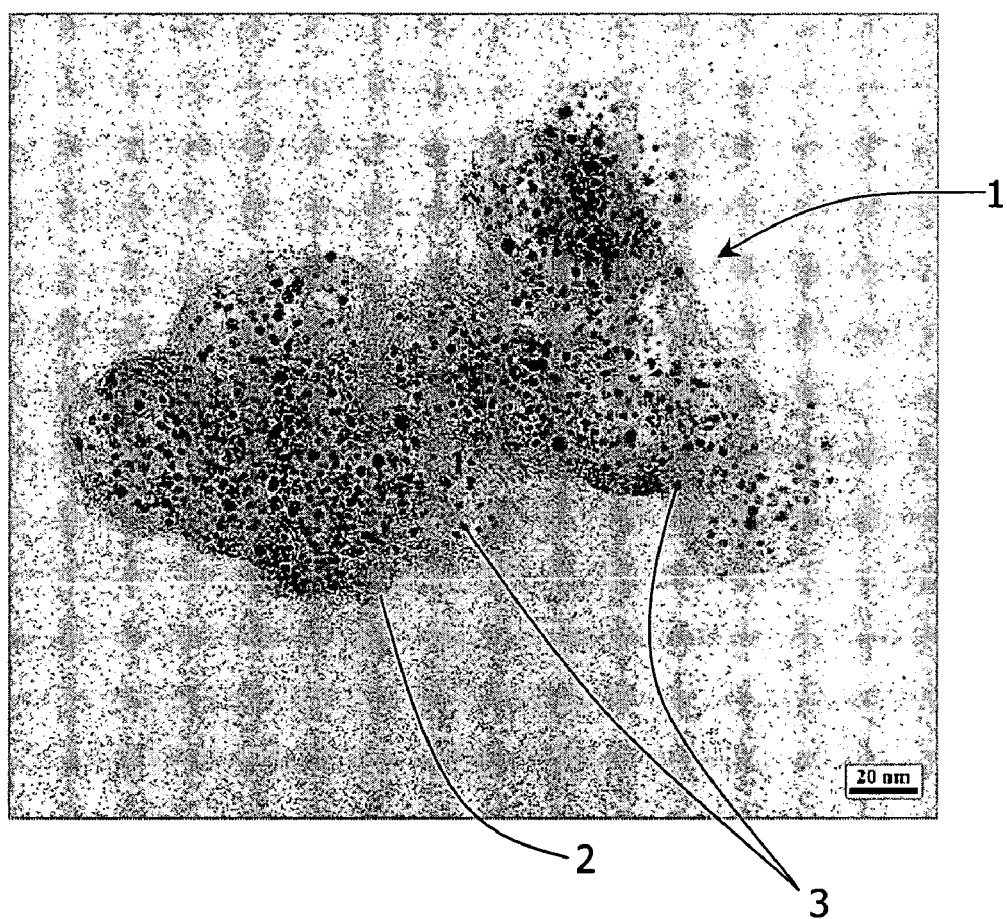
FIG. 1 is a photograph of a TEM image of a carbon support with catalyst nanoparticles deposited thereon, in accordance with the present invention.

The present invention is directed to a composition having catalytic activity for use in, for example, oxidation and/or reduction reactions of interest in a polyelectrolyte membrane fuel cell (e.g., an electrocatalyst), the composition comprising, as further detailed herein, platinum, copper and nickel.

In this regard it is to be noted that, in general, it is desirable, but not essential, to reduce the cost of a catalyst composition to be used in such reactions, particularly when used in fuel cells. One method of reducing the cost of the catalyst composition is to decrease the amount of noble metals (such as platinum) used to produce it. Typically, however, as the concentrations of noble metals are decreased, catalyst compositions tend to become more susceptible to corrosion and/or the absolute activity may be diminished. Thus, it is typically desirable to achieve the most activity per weight percent of noble metals (see, e.g., End Current Density/Weight Fraction of Pt, as set forth in Tables A-H, infra). Preferably, this is accomplished without compromising, for example, the life cycle of the fuel cell in which the catalyst composition is placed. In addition to, or as an alternative to, reducing cost by limiting the noble metal concentration, a catalyst composition of the present invention may be selected because it represents an improvement in corrosion resistance and/or activity compared to platinum (e.g., at least a 3 times increase in electrocatalytic activity compared to platinum).

The present invention is thus directed to a composition that has catalytic activity in oxidation and/or reduction reactions, and that comprises platinum, copper and nickel. Optionally, the catalyst composition of the present invention may be in the form of an alloy of these metals, the composition for example consisting essentially of an alloy containing these metals. Alternatively, the catalyst composition of the present invention may comprise these metals, a portion of which is in the form of an alloy, the composition for example having alloy particles inter-mixed with oxide particles as a coating, as a pseudo-support, and/or a simple mixture.

The catalyst composition of the present invention comprises amounts of platinum, copper and nickel which are sufficient for the metals, present therein, to play a role in the catalytic activity and/or crystallographic structure of the catalyst composition. Stated another way, the concentrations of platinum, copper and nickel in the present catalyst composition are such that the presence of the metals would not be considered an impurity therein. For example, when present, the concentrations of each of platinum, copper and nickel are at least about 0.1, 0.5, 1 or even 2 atomic percent, wherein the sum of the concentrations of platinum, copper and nickel may be greater than 95 atomic percent, 96 atomic percent, 97 atomic percent, 98 atomic percent, or even 99 atomic percent. Advantageously and surprisingly, it has been discovered that the catalyst compositions of the present invention may exhibit favorable electrocatalytic activity while having reduced amounts of platinum, as compared to, for example, a platinum standard.

In this regard it is to be noted that the catalyst compositions of the present invention may optionally consist essentially of the platinum, copper and nickel (e.g., impurities that play little, if any, role in the catalytic activity and/or crystallographic structure of the catalyst may be present to some degree), the concentrations of the metals being within any one or more of the ranges for an individual metal as set forth herein, or for the combination of metals. Stated another way, the concentration of a metallic or non-metallic element other than platinum, copper and nickel may optionally not exceed what would be considered an impurity (e.g., less than 1, 0.5, 0.1, or 0.01 atomic percent). However, it is possible that the catalyst of the present invention may alternatively comprise platinum, copper and nickel, as well as other constituents, including for example platinum, copper and/or nickel oxides and/or carbides. It is therefore to be noted that in some embodiments the total concentration of platinum, copper and nickel may be less than about 100 percent of the metal atoms present therein.

It is to be further noted that in one or more embodiments of the present invention, platinum, copper and/or nickel are substantially in their metallic oxidation states. Stated another way, the average oxidation state of platinum, copper and/or nickel are at or near zero. Although in such embodiments there may be portions of the catalyst composition wherein the oxidation states of one or more of platinum, copper and nickel are greater than zero, the average oxidation states of these elements throughout the entire composition is less than the lowest commonly occurring oxidation state for that particular element (e.g., the lowest commonly occurring oxidation states for platinum, copper and nickel are 2, 1 and 1, respectively). Therefore, the average oxidation states of platinum may be, in order of increasing preference, less than 2, 1.5, 1, 0.5, 0.1, or 0.01, or even zero, while the average oxidation state of copper and/or nickel may be, in order of increasing preference, less than 1, 0.5, 0.1, or 0.01, or even zero.

It is to be still further noted, however, that in an alternative embodiment of the present invention, the platinum, copper and/or nickel may not be substantially present in their metallic oxidation states. Stated another way, in one or more embodiments of the present invention, the platinum, copper and/or nickel present in the catalyst composition may have an average oxidation state that is greater than zero (the platinum, copper and/or nickel being present in the catalyst, for example, as an oxide or as a carbide).

1. Catalyst Compositions

A. Constituent Concentrations

As previously disclosed, the catalyst composition of the present invention comprises platinum. The concentration of platinum therein is greater than 50 atomic percent (e.g., preferably greater than about 55, about 60, about 65, about 70, about 75, or even about 80 atomic percent). For example, the platinum concentration may preferably range from greater than 50 to about 80 atomic percent, more preferably from about 55 to about 75 atomic percent, or even more preferably from about 60 to about 70 atomic percent.

In this regard it is to be noted, however, that the scope of the present invention is intended to encompass all of the various platinum concentration range permutations possible herein, in view of the above-noted maxima and minima.

The concentration of copper in the catalyst composition of the present invention may also vary within a large compositional range. For example, the concentration of copper may be greater than 25 atomic percent (e.g., at least about 30, about 35, about 40, about 45, or even about 50 atomic percent), ranging for example from greater than 25 to about 45 atomic percent, or from about 30 to about 40 atomic percent. Alternatively, however, the concentration of copper may be less than 25 atomic percent (e.g., less than about 20, about 15, about 10, about 8, about 6, about 4, or about 2 atomic percent), ranging for example from about 2 to about 20 atomic percent, from about 4 to about 15 atomic percent, or from about 6 to about 10 atomic percent.

In this regard it is to be noted, however, that the scope of the present invention is intended to encompass all of the various copper concentration range permutations possible herein, in view of the above-noted maxima and minima.

The concentration of nickel in the catalyst compositions of the present invention may, like copper, also vary within a large compositional range. For example, the concentration of nickel may be less than 25 atomic percent (e.g., less than about 20, about 15, about 10, about 8, about 6, about 4, or about 2 atomic percent), ranging for example from about 1 to about 20 atomic percent, from about 2 to about 15 atomic percent, or from about 5 to about 10 atomic percent. Alternatively, however, the concentration of nickel may be greater than 25 atomic percent (e.g., at least about 30, about 35, about 40, about 45, or even about 50 atomic percent), ranging for example from greater than 25 to about 45 atomic percent, or from about 30 to about 40 atomic percent.

In this regard it is to be noted, however, that the scope of the present invention is intended to encompass all of the various nickel concentration range permutations possible herein, in view of the above-noted maxima and minima.

It is to be further noted that the catalyst composition of the present invention may encompass any of the various combinations of platinum, copper and nickel concentrations and/or ranges of concentrations set forth above without departing from its intended scope. For example, for those embodiments wherein the catalyst composition of the present invention comprises platinum, copper and nickel: (i) the sum of the concentrations of platinum, copper and nickel may be greater than 95 atomic percent, and the concentration of platinum may be greater than 50 atomic percent and less than about 80 atomic percent; (ii) the concentration of copper may be greater than 25 atomic percent; (iii) the concentration of nickel may be greater than 25 atomic percent; (iv) the concentration of nickel may be less than 25 atomic percent; or, (v) the concentration of copper may be less than 25 atomic percent. Alternatively, more than one of these noted features may be present in the catalyst composition (e.g., (i) and (ii); (i) and (iii); (i) and (iv); (i) and (v); (ii) and (iii); (ii) and (iv); (iii) and (v); (i), (ii) and (iv); or, (i), (iii) and (v)).

It is to be still further noted that the present invention may alternatively encompass catalyst compositions wherein the sum of copper and nickel exceed about 30 atomic percent, about 40 atomic percent, or even about 50 atomic percent (e.g., about 55 atomic percent, about 60 atomic percent, about 65 atomic percent, about 70 atomic percent, about 75 atomic percent or more). For example, the present invention may alternatively encompass catalyst compositions wherein: (i) the concentration of platinum is about 50 atomic percent, the concentration of copper is about 20 atomic percent, and the concentration of nickel is about 30 atomic percent, or (ii) the concentration of platinum is about 60 atomic percent, the concentration of copper is about 10 atomic percent, and the concentration of nickel is about 30 atomic percent.

B. Atomic Ratios of Constituents

The catalyst compositions of the present invention may alternatively or additionally be characterized in terms of atomic ratios between the constituents. More specifically, it has been discovered that when used as a catalyst one or more electrocatalytic properties (e.g. activity) of the compositions of the present invention may be controlled by controlling the ratio of copper to nickel. Specifically, it has been discovered that activity may be altered (e.g., increased), in for example a catalyst composition wherein the concentration of platinum is greater than about 50 atomic percent, by controlling the atomic ratio of copper to nickel such that this ratio is at least about 1.5:1 (copper being in excess relative to nickel). In such an embodiment, the atomic ratio of copper to nickel may preferably be at least about 2:1, more preferably at least about 3:1, still more preferably at least about 4:1, still more preferably at least about 5:1, still more preferably at least about 6:1, still more preferably at least about 7:1, and still more preferably at least about 8:1.

In an alternative embodiment, activity may be increased by controlling the atomic ratio of nickel to copper, in for example a composition wherein the platinum concentration is greater than 50 atomic percent, such that this ratio is at least about 1.5:1 (nickel being in excess relative to copper). In such an embodiment, preferably the atomic ratio of nickel to copper is at least about 2:1, more preferably at least about 2.5:1, still more preferably at least about 3:1, still more preferably at least about 3.5:1, still more preferably at least about 4:1, still more preferably at least about 4.5:1, and still more preferably at least about 5:1.

C. Compositional Drift

As has been reported elsewhere, subjecting a catalyst composition to an electrocatalytic reaction (e.g., the operation of a fuel cell) may change the composition by leaching one or more constituents (e.g., copper and/or nickel) from the catalyst (see, e.g., Catalysis for Low Temperature Fuel Cells Part 1: The Cathode Challenges, T. R. Ralph and M. P. Hogarth, Platinum Metals Rev., 2002, 46, (1), p. 3-14). Without being held to any particular theory, it is believed that this leaching effect may potentially act to increase the activity of the catalyst by increasing the surface area and/or by changing the surface composition of the catalyst. In fact, the purposeful leaching of catalyst compositions after synthesis to increase the surface area has been disclosed by Itoh et al. (see, e.g., U.S. Pat. No. 5,876,867 which is incorporated herein by reference). Accordingly, it is to be noted that the concentrations, concentration ranges, and atomic ratios detailed herein for the catalyst compositions of the present invention are intended to include the bulk stoichiometries, any surface stoichiometries resulting therefrom, and modifications of the bulk and/or surface stoichiometries that result by subjecting the catalyst compositions of the present invention to a reaction (e.g., an electrocatalytic reaction) of interest.

2. Catalyst Composition Precursors

A. Washing/Leaching

With respect to the above-noted compositional drift that has been observed in use, it is to be further noted that, as illustrated by the results presented in, for example, Table H herein, it has further been observed that the performance (e.g., activity) of a catalyst composition of the present invention, having a platinum concentration which is greater than 50 atomic percent in use (i.e., after drift has occurred), is improved as compared to a composition that has been prepared to have a concentration of 50 atomic percent platinum or greater prior to use. Stated another way, it has been observed that a catalyst composition comprising platinum, copper and nickel as detailed herein which, after the loss of copper and/or nickel therefrom, has a platinum concentration that is greater than 50 atomic percent performs better than a catalyst composition that has been prepared to initially have the same, or similar, composition (compare, for example, the relative activities reported for: (i) samples HFC 924, having an initial composition of $Pt_{25}Cu_{45}Ni_{30}$ and a final composition of $Pt_{56}Cu_{25}N_{19}$ v. HFC 991, having a composition of $Pt_{55}Cu_{25}Ni_{20}$, or (ii) HFC 978, having an initial composition of $Pt_{30}Cu_{55}Ni_{15}$ and a final composition of $Pt_{51}Cu_{35}Ni_{14}$ v. HFC 982, having a composition of $Pt_{50}Cu_{35}Ni_{15}$).

Accordingly, the present invention is further directed to a precursor to the catalyst compositions of the present invention, the precursor comprising platinum, copper and nickel, wherein the concentration of platinum therein is less than 50 atomic percent, and preferably is less than 45 atomic percent, more preferably less than 40 atomic percent, still more preferably less than 35 atomic percent, still more preferably less than 30 atomic percent, still more preferably less than 25 atomic percent, and still more preferably less than 20 atomic percent (preferably ranging, for example, from greater than about 10 to about 45 atomic percent, or more preferably from about 20 to about 40 atomic percent).

Additionally, the concentration of copper in the catalyst composition precursor may be as set forth elsewhere herein (with respect to the catalyst composition), or alternatively may be within the range of from about 10 to about 75 atomic percent, preferably from about 15 to about 65 atomic percent, more preferably from about 20 to about 55 atomic percent, or still more preferably from about 25 to about 45 atomic percent. Similarly, the concentration of nickel in the catalyst composition precursor may be as set forth elsewhere herein (with respect to the catalyst composition), or alternatively may be within the range of from about 10 to about 75 atomic percent, preferably from about 15 to about 65 atomic percent, more preferably from about 20 to about 55 atomic percent, or still more preferably from about 25 to about 45 atomic percent.

Exemplary embodiments of the catalyst composition precursor of the present invention include those wherein: (i) the concentration of platinum is within the range of from about 20 to 30 atomic percent, the concentration of copper is within the range of from about 30 to about 65 atomic percent, and the concentration of nickel is within the range of from about 10 to about 50 atomic percent; (ii) the concentration of platinum is within the range of from about 20 to 25 atomic percent, the concentration of copper is about 30 atomic percent, and the concentration of nickel is about 50 atomic percent; and (iii) the concentration of platinum is within the range of from about 20 to 25 atomic percent, the concentration of copper is within the range of from about 60 to about 65 atomic percent, and the concentration of nickel is within the range of from about 10 to about 20 atomic percent.

The present invention is therefore additionally directed to a method for the preparation of a catalyst composition from a catalyst precursor composition, said precursor composition comprising platinum, copper and nickel as set forth herein above (e.g., the sum of the concentrations of platinum, copper and nickel therein being greater than 95 atomic percent, and the concentration of platinum therein being less than 45 atomic percent). Generally speaking, the process comprises subjecting said precursor composition to conditions sufficient to remove a portion of the copper and/or nickel present therein (such that a catalyst composition, as set forth elsewhere herein is obtained, the catalyst composition comprising, for example, platinum, copper and nickel, wherein the sum of the concentrations thereof is greater than 95 atomic percent and the concentration of platinum therein is greater than 55 atomic percent).

In one preferred embodiment of the above-noted method, the catalyst precursor composition is contacted with an acidic solution to wash or remove a portion of the copper and/or nickel present therein out of the precursor. For example, a given weight of the catalyst precursor composition may be contacted with a quantity of a perchloric acid ($HClO_4$) solution (e.g., 1 M), heated (e.g., about 90 to about 95° C.) for a period of time (e.g., about 60 minutes), filtered, and then repeatedly washed with water. The resulting filtrate typically has a pale blue color, indicating the presence of copper and/or nickel ions. The precursor composition is preferably washed a second time, the solid cake isolated from the first filtration step being collected and then subjected to substantially the same sequence of steps as previously performed, the cake being agitated sufficiently to break it apart prior to and/or during the time spent heating the cake/acid solution mixture back up to the desired temperature. After the final filtration has been performed, the isolated cake is dried (e.g., heated at about 90° C. for about 48 hours).

It is to be noted, however, that in an alternative embodiment the catalyst precursor composition may be exposed to conditions common within a fuel cell (e.g., immersion in an electrochemical cell containing an aqueous 0.5 M $H_2SO_4$ electrolyte solution maintained at room temperature, such as described in Example 4, herein below), in order to leach copper and/or nickel from the precursor. Alternatively, the precursor may be directly subjected to an electrochemical reaction wherein, for example, a hydrogen-containing fuel and oxygen are converted to reaction products and electricity in a fuel cell comprising an anode, a cathode, a proton exchange membrane therebetween, the catalyst precursor composition, and an electrically conductive external circuit connecting the anode and cathode. By contacting the hydrogen-containing fuel or the oxygen and the catalyst precursor composition, the hydrogen-containing fuel is oxidized and/or the oxygen is catalytically reduced. As part of this reaction, copper and/or nickel are thus dissolved in situ from the catalyst precursor composition. After this reaction has been allowed to continue for a length of time sufficient to obtain a substantially stable composition (i.e., a composition wherein the concentration of platinum, copper and/or nickel remain substantially constant), the composition may be removed from the cell and used as a catalyst composition in an future fuel cell reaction of interest.

It is to be still further noted that the process for removing a portion of, for example, the copper and/or nickel from the catalyst composition precursor may be other than herein described without departing from the scope of the present invention. For example, alternative solutions may be used (e.g., $HCF_3SO_3H$, Nafion, $HNO_3$, HCl, $H_2SO_4$, $CH_3CO_2H$), and/or alternative concentrations (e.g., about 0.05 M, 0.1 M, 0.5 M, 1 M, 2 M, 3 M, 4 M, 5 M, etc.), and/or alternative temperatures (e.g., about 25° C., 35° C., 45° C., 55° C., 65° C., 75° C., 85° C., etc.), and/or alternative washing times or durations (e.g., about 5 minutes, 10 minutes, 20 minutes, 30 minutes, 40 minutes, 50 minutes, 60 minutes or more), and/or alternative numbers of washing cycles (e.g., 1, 2, 3, 4, 5 or more), and/or alternative washing techniques (e.g., centrifugation, sonication, soaking, electrochemical techniques, or a combination thereof), and/or alternative washing atmospheres (e.g., ambient, oxygen enriched, argon), as well as various combinations thereof (selected using means common in the art).

It is to be still further noted that the compositions of the precursors recited above, and/or elsewhere herein, refer to the overall stoichiometries, or bulk stoichiometries, of a prepared precursor composition, before being subjected to washing or in situ leaching conditions of some kind (e.g., subjected to use conditions in an electrocatalytic cell). Accordingly, a reported precursor composition (e.g., a precursor composition comprising or consisting essentially of an alloy of the recited metals) is an average stoichiometry over the entire volume of the prepared precursor composition, and therefore, localized stoichiometric variations may exist. For example, the volume of a particle precursor composition comprising the surface and the first few atomic layers inward therefrom may differ from the bulk stoichiometry. Likewise, within the bulk of the particle there may be stoichiometric variations. The surface stoichiometry corresponding to a particular bulk stoichiometry is highly dependant upon the method and conditions under which the precursor composition is prepared. As such, precursor compositions having the same bulk stoichiometry may have significantly different surface stoichiometries. Without being bound to a particular theory, it is believed the differing surface stoichiometries are due at least in part to differences in the atomic arrangements, chemical phases and homogeneity of the compositions.

B. Lattice Parameter

It is also to be noted that the lattice parameter of the catalyst composition precursor of the present invention has been observed to change in an unexpected manner as a result of, for example, washing to remove copper and/or nickel therefrom. More specifically, as illustrated by the results presented in Table I, below, after samples having the same initial composition were subjected to various washing procedures (as further detailed below), the observed lattice parameters (reported in angstroms, Å) of the resulting catalyst compositions (i.e., the washed precursors), as determined using means known in the art (such as X-ray diffraction), are less than the lattice parameters for the same compositions, as calculated in accordance with Vegard's Law using means known in the art (see, e.g., U.S. Pat. No. 5,876,867).

TABLE I

| Sample | Initial Comp.* | | | Relative Activity | Wash Protocol | Comp. After Wash | | | Comp. After Screen | | | Observed Lattice Parameter after Synthesis | Observed Lattice Parameter after Washing | Calculated Lattice Parameter after Washing | Delta from Vegard's Law |
|---|---|---|---|---|---|---|---|---|---|---|---|---|---|---|---|
| | Pt | Cu | Ni | | | Pt | Cu | Ni | Pt | Cu | Ni | | | | |
| 1122 | 25 | 65 | 10 | 3.20 | A | 57 | 41 | 2 | 70 | 27 | 3 | 3.6957 Å | 3.7456 Å | 3.7967 Å | 0.0511 |
| 1123 | 25 | 65 | 10 | 2.90 | B | 50 | 48 | 2 | 68 | 30 | 2 | 3.6957 Å | 3.7359 Å | 3.7763 Å | 0.0404 |
| 1186 | 25 | 65 | 10 | 3.28 | C | 55 | 37 | 9 | 63 | 31 | 6 | 3.6957 Å | 3.7359 Å | 3.7856 Å | 0.0497 |
| 1187 | 25 | 65 | 10 | 2.80 | D | 52 | 41 | 8 | 65 | 29 | 6 | 3.6957 Å | 3.7359 Å | 3.7774 Å | 0.0415 |
| 1188 | 25 | 65 | 10 | 2.75 | E | 52 | 43 | 6 | 69 | 28 | 3 | 3.6957 Å | 3.7434 Å | 3.7802 Å | 0.0368 |
| 1581 | 25 | 65 | 10 | 3.35 | F | 54 | 37 | 9 | 64 | 30 | 6 | 3.6957 Å | 3.7528 Å | 3.7842 Å | 0.0314 |

*All samples used herein were prepared from a single powder of composition $Pt_{25}Cu_{65}Ni_{10}$ (see, e.g., Sample HFC 1116 in Table H, below, which was prepared using an anneal temperature of 800° C. and an anneal duration of 6 hours).

Wash Protocols:

(A) room temperature, in 0.5 M $H_2SO_4$ for 60 minutes, repeat once (i.e., two wash sequences performed)
(B) room temperature, in 5 M $H_2SO_4$ for 60 minutes, repeat once (i.e., two wash sequences performed)
(C) 90° C., in 1 M $HClO_4$ for 60 minutes, repeat once (i.e., two wash sequences performed)
(D) 90° C., in 1 M $HClO_4$ for 60 minutes (i.e., only one wash sequence performed)
(E) room temperature, in 1 M $HClO_4$ for 60 minutes (i.e., only one wash sequence performed)
(F) 90° C., in 1 M $HClO_4$ for 60 minutes, repeat once (i.e., two wash sequences performed)

The present invention is therefore further directed to one or more of the catalyst compositions (i.e., washed precursors) as set forth herein, wherein the composition additionally has an observed lattice constant which is less than a lattice constant as calculated in accordance with Vegard's Law for the same composition. For example, a catalyst composition of the present invention may comprise platinum, copper and nickel, wherein the sum of the concentrations of platinum, copper and nickel is at least 95 atomic percent, the concentration of platinum being greater than 50 atomic percent, and further wherein the observed lattice constant is less than the calculated latticed constant. The difference, or delta, between the expected lattice parameter, as calculated in accordance with Vegard's Law, and the observed lattice parameter, as determined using means known in the art, may be, for example, at least about 1%, 1.5%, 2%, 3%, 4%, 5% or more (ranging, for example, from about 1% to about 5%, or from about 1.5% to about 3%), relative to the expected lattice parameter.

3. Formation of Catalyst Composition Precursors Comprising/Consisting Essentially of an Alloy The catalyst composition, and/or the catalyst composition precursor, of the present invention may consist essentially of an alloy of platinum, copper and nickel. Alternatively, the catalyst composition, and/or the catalyst composition precursor, of the present invention may comprise an alloy of platinum, copper and nickel; that is, one or both of these may alternatively comprise an alloy of these metals, and optionally one or more of these metals in a non-alloy form (e.g., a platinum, copper and/or nickel salt and/or oxide and/or carbide).

Such alloys may be formed by a variety of methods. For example, the appropriate amounts of the constituents (e.g., metals) may be mixed together and heated to a temperature above the respective melting points to form a molten solution of the metals that is cooled and allowed to solidify.

Typically, the catalyst compositions of the present invention, and/or the precursors thereto, are used in a powder form to increase the surface area, which in turn increases the number of reactive sites, and thus leads to improved efficiency of the cell in which the catalyst compositions are being used. Thus, a formed catalyst composition alloy, and/or the precursor thereto, may be transformed into a powder after being solidified (e.g., by grinding), or during solidification (e.g., spraying molten alloy and allowing the droplets to solidify). In this regard it is to be noted, however, that in some instances it may be advantageous to evaluate alloys for electrocatalytic activity in a non-powder form, as further described and illustrated elsewhere herein (see, e.g., Examples 1 and 2, infra).

To further increase surface area and efficiency, a catalyst composition alloy (i.e., a catalyst composition comprising or consisting essentially of an alloy), and/or the precursor thereto, may be deposited over the surface of electrically conductive supports (e.g., carbon black) for use in a fuel cell. One method for loading a catalyst composition or precursor alloy onto supports typically comprises depositing metal (e.g., platinum, copper and/or nickel) compounds onto the supports, converting these compounds to metallic form, and then alloying the metals using a heat-treatment in a reducing atmosphere (e.g., an atmosphere comprising an inert gas such as argon and/or a reducing gas such as hydrogen). One method for depositing these compounds involves the chemical precipitation thereof onto the supports. The chemical precipitation method is typically accomplished by mixing supports and sources of the metal compounds (e.g., an aqueous solution comprising one or more inorganic metal salts) at a concentration sufficient to obtain the desired loading of the catalyst composition, or precursor thereto, on the supports, after which precipitation of the compounds is initiated (e.g., by adding an ammonium hydroxide solution). The slurry is then typically filtered from the liquid under vacuum, washed with deionized water, and dried to yield a powder that comprises the metal compounds on the supports.

Another method for depositing the metal compounds comprises forming a suspension comprising a solution and supports suspended therein, wherein the solution comprises a solvent portion and a solute portion that comprises the metal compound(s) being deposited. The suspension is frozen to deposit (e.g., precipitate) the compound(s) on the support particles. The frozen suspension is then freeze-dried to remove the solvent portion, leaving a freeze-dried powder comprising the supports and the deposits of the metal compound(s) on the supports.

Since the process may involve sublimation of the solvent portion from the frozen suspension, the solvent portion of the solution in which the supports are suspended preferably has an appreciable vapor pressure below its freezing point. Examples of such sublimable solvents that also dissolve many metal-containing compounds and metals include water, alcohols (e.g., methanol, ethanol, etc.), acetic acid, carbon tetrachloride, ammonia, 1,2-dichloroethane, N,N-dimethyl-formamide, formamide, etc.

The solution in which the supports are dispersed/suspended provides the means for delivering the metal species which is to be deposited onto the surfaces of the supports. The metal species may be the final desired form, but in many instances it is not. If the metal species is not a final desired form, the deposited metal species may be subsequently converted to the final desired form. Examples of such metal species that may be subsequently converted include inorganic and organic metal compounds such as metal halides, sulfates, carbonates, nitrates, nitrites, oxalates, acetates, formates, etc. Conversion to the final desired form may be made by thermal decomposition, chemical reduction, or other reaction. Thermal decomposition, for example, is brought about by heating the deposited metal species to obtain a different solid material and a gaseous material. In general, as is known, thermal decomposition of halides, sulfates, carbonates, nitrates, nitrites, oxalates, acetates, and formates may be carried out at temperatures between about 200 and about 1,200° C.

If conversion of the deposited metal species to the final desired form is to occur, the deposited metal species is usually selected such that any unwanted by-products from the conversion can be removed from the final product. For example, during thermal decomposition the unwanted decomposition products are typically volatilized. To yield a final product that is a metal alloy, the deposited metal species are typically selected so that the powder comprising the deposited metal species may be reduced without significantly altering the uniformity of the metal deposits on the surface of the supports and/or without significantly altering the particle size of the final powder (e.g., through agglomeration).

Nearly any metal may be deposited onto supports by one or more of the processes noted herein, provided that the metal or compound containing the metal is capable of being dissolved in a suitable medium (i.e., a solvent). Likewise, nearly any metal may be combined with, or alloyed with, any other metal provided the metals or metal-containing compounds are soluble in a suitable medium.

The solute portion may comprise an organometallic compound and/or an inorganic metal-containing compound as a source of the metal species being deposited. In general, organometallic compounds are more costly, may contain more impurities than inorganic metal-containing compounds, and may require organic solvents. Organic solvents are more costly than water and typically require procedures and/or treatments to control purity or negate toxicity. As such, organometallic compounds and organic solvents are generally not preferred. Examples of appropriate inorganic salts include $Cu(NO_3)_2.2H_2O$ and $Ni(NO_3)_2.6H_2O$. Such salts are highly soluble in water and, as a result, water is often considered to be a preferred solvent. In some instances, it is desirable for an inorganic metal-containing compound to be dissolved in an acidic solution prior to being mixed with other inorganic metal-containing compounds.

To form a catalyst alloy, or catalyst precursor alloy, having a particular composition or stoichiometry, the amounts of the various metal-containing source compounds necessary to achieve that composition are determined in view thereof. If the supports have a pre-deposited metal, the loading of the pre-deposited metal on the supports is typically taken into account when calculating the necessary amounts of metal-containing source compounds. After the appropriate amounts of the metal-containing compounds are determined, the solution may be prepared by any appropriate method. For example, if all the selected metal-containing source compounds are soluble at the desired concentration in the same solvent at room temperature, they may merely be mixed with the solvent. Alternatively, the suspending solution may be formed by mixing source solutions, wherein a source solution comprises a particular metal-containing source compound at a particular concentration. If, however, all of the selected compounds are not soluble at the same temperature when mixed together (either as powders in a solvent or as source solutions), the temperature of the mixture may be increased to increase the solubility limit of one or more of the source compounds so that the suspending solution may be formed. In addition to adjusting solubility with temperature, the stability of the suspending solution may be adjusted, for example, by the addition of a buffer, by the addition of a complexing agent, and/or by adjusting the pH.

In addition to varying the amounts of the various metals to form alloys having different compositions, this method allows for a wide variation in the loading of the metal onto the supports. This is beneficial because it allows for the activity of a supported catalyst composition (e.g., an electrocatalyst powder) to be maximized. The loading may be controlled in part by adjusting the total concentration of the various metals in the solution while maintaining the relative amounts of the various metals. In fact, the concentrations of the inorganic metal-containing compounds may approach the solubility limit for the solution. Typically, however, the total concentration of inorganic metal-containing compounds in the solution is between about 0.01 M and about 5 M, which is well below the solubility limit. In one embodiment, the total concentration of inorganic metal-containing compounds in the solution is between about 0.1 M and about 1 M. Concentrations below the solubility limit are used because it is desirable to maximize the loading of the supported catalysts without decreasing the surface area of the metal deposits. Depending, for example, on the particular composition, the size of the deposits, and the uniformity of the distribution of deposits on the supports, the loading may typically be between about 5 and about 60 weight percent. In one embodiment, the loading is between about 15 and about 45 or about 55 weight percent, or between about 20 and about 40 or about 50 weight percent. In another embodiment, the loading is about 20 weight percent, about 40 weight percent, or about 50 weight percent.

The supports upon which the metal species (e.g., metal-containing compound) is to be deposited may be of any size and composition that is capable of being dispersed/suspended in the solution during the removal of heat to precipitate the metal species thereon. The maximum size depends on several parameters including agitation of the suspension, density of the supports, specific gravity of the solution, and the rate at which heat is removed from the system. In general, the supports are electrically conductive and are useful for supporting catalytic compounds in fuel cells. Such electrically conductive supports are typically inorganic, for example, carbon supports. However, the electrically conductive supports may comprise an organic material such as an electrically conductive polymer (see, e.g., in U.S. Pat. No. 6,730,350). Carbon supports may be predominantly amorphous or graphitic and they may be prepared commercially, or specifically treated to increase their graphitic nature (e.g., heat treated at a high temperature in vacuum or in an inert gas atmosphere) thereby increasing corrosion resistance. Carbon black support particles may have a Brunauer, Emmett and Teller (BET) surface area up to about 2000 $m^2/g$. It has been reported that satisfactory results are achieved using carbon black support particles having a high mesoporous area, e.g., greater than about 75 $m^2/g$ (see, e.g., Catalysis for Low Temperature Fuel Cells Part 1: The Cathode Challenges, T. R. Ralph and M. P. Hogarth, Platinum Metals Rev., 2002, 46, (1), p. 3-14). Experimental results to-date indicate that a surface area of about 500 $m^2/g$ is preferred.

In another embodiment, the supports may have a pre-deposited material thereon. For example, when the final composition of the deposits on the carbon supports is a platinum alloy, it may be advantageous to use a carbon supported platinum powder. Such powders are commercially available from companies such as Johnson Matthey, Inc., of New Jersey and E-Tek Div. of De-Nora, N. A., Inc., of Somerset, N.J. and may be selected to have a particular loading of platinum. The amount of platinum loading is selected in order to achieve the desired stoichiometry of the supported metal alloy. Typically, the loading of platinum is between about 5 and about 60 weight percent. Preferably, the loading of platinum is between about 15 and 45 weight percent. The size (i.e., the maximum cross-sectional length) of the platinum deposits is typically less than about 20 nm. For example, the size of the platinum deposits may be less than about 10 nm, 5 nm, 2 nm, or smaller; alternatively, the size of the platinum deposits may be between about 2 and about 3 nm. Experimental results to-date indicate that a desirable supported platinum powder may be further characterized by having a platinum surface area of between about 150 and about 170 $m^2/g$ (determined by CO adsorption), a combined carbon and platinum surface area of between about 350 and about 400 $m^2/g$ (determined by $N_2$ adsorption), and an average support size that is between about 100 and about 300 nm.

The solution and supports are mixed according to any appropriate method to form the dispersion/suspension, using means known in the art. Exemplary methods of mixing include magnetic stirring, insertion of a stirring structure or apparatus (e.g., a rotor), shaking, sonication, or a combination of the foregoing methods. Provided that the supports can be adequately mixed with the solution, the relative amounts of supports and solution may vary over a wide range. For example, when preparing carbon supported catalysts using an aqueous suspension comprising dissolved inorganic metal-containing compounds, the carbon supports typically comprise between about 1 and about 30 weight percent of the suspension. Preferably, however, the carbon supports comprise between about 1 and about 15 weight percent of the suspension, between about 1 and about 10 weight percent of the suspension, between about 3 and about 8 weight percent of the suspension, between about 5 and about 7 weight percent of the suspension, or about 6 weight percent of the suspension.

In this regard it is to be noted that the above-referenced amounts of carbon supports in suspension may apply equally to other, non-carbon supports noted herein, or which are known in the art.

The relative amounts of supports and solution may also be described in terms of volumetric ratios. For example, the dispersion/suspension may have a volumetric ratio of support particles to solution or solvent that is at least about 1:10. Specifying a minimum volumetric ratio indicates that the volume of support particles may be increased relative to the volume of solution or solvent. As such, the volume ratio of support particles to solution or solvent may more preferably be at least about 1:8, about 1:5, or even about 1:2.

In one method of preparation, the solution and supports described or illustrated herein are mixed using sonication at a power and for a duration sufficient to form a dispersion/suspension in which the pores of the supports are impregnated with the solution and/or the supports are uniformly distributed throughout the solution. If the dispersion/suspension is not uniformly mixed (i.e., the supports are not uniformly impregnated with the solution and/or the supports are not uniformly distributed throughout the solution), the deposits formed on the supports will typically be non-uniform (e.g., the loading of the metal species may vary among the supports, the size of the deposits may vary significantly on a support and/or among the supports, and/or the composition of the deposits may vary among the supports). Although a uniform mixture, or distribution of supports in the solution, is generally preferred, there may be circumstances in which a non-uniform mixture, or distribution of supports in the solution, is desirable.

When a freeze-drying method of preparation is employed, typically the uniformity of the distribution of particles in the dispersion/suspension is maintained throughout the removal of heat therefrom. This uniformity may be maintained by continuing the mixing of the dispersion/suspension as it is being cooled. The uniformity may, however, be maintained without mixing by the viscosity of the dispersion/suspension. The actual viscosity needed to uniformly suspend the support particles depends in large part on the amount of support particle in the dispersion/suspension and the size of the support particles. To a lesser degree, the necessary viscosity depends on the density of the support particles and the specific gravity of the solution. In general, the viscosity is typically sufficient to prevent substantial settling of the support particles as the heat is being removed from the suspension to precipitate the deposits, and/or, if desired, until the dispersion/suspension is solidified by the freezing of the solution or solvent. The degree of settling, if any, may be determined, for example, by examining portions of the solidified or frozen suspension. Typically, substantial settling would be considered to have occurred if the concentration of supports in any two portions varies by more than about ±10%. When preparing a carbon supported catalyst powder, or precursors thereto, in accordance with the freeze-drying method, the viscosity of the suspension/dispersion is typically sufficient to prevent substantial settling for at least about 4 minutes. In fact, the viscosity of the suspension/dispersion may be sufficient to prevent substantial settling for at least about 10 minutes, at least about 30 minutes, at least about 1 hour, at least about 6 hours, at least about 12 hours, at least about 18 hours, or even up to about 2 days. Typically, the viscosity of the dispersion/suspension is at least about 5,000 mPa·s.

Heat is removed from the dispersion/suspension so that at least a part of the solute portion separates from the solvent portion and deposits (e.g., precipitates) a metal species/precipitated metal onto the supports and/or onto any pre-existing deposits (e.g., a pre-deposited metal and/or pre-deposited metal species formed, for example, by precipitation of incompatible solutes). If the concentration of supports in the suspension is sufficient (e.g., within the ranges set forth above) and enough heat is removed, nearly all of the metal species to be deposited is separated from the solvent portion to form deposits (e.g., precipitates) comprising the metal species on the supports. In one embodiment, the heat is removed to solidify or freeze the dispersion/suspension and form a composite comprising the supports/particulate support with deposits comprising the metal species or a precipitated metal on the supports/particulate support, within a matrix of the solvent portion in a solid state. If the concentration of the solute portion in the solution exceeds the ability of the supports to accommodate deposits of the metal species, some of the solute portion may crystallize within the matrix. If this occurs, such crystals are not considered to be a supported powder.

In one embodiment of the present invention, the size of the deposits of the metal species is controlled such that the eventually formed deposits of the catalyst composition alloy, or precursor thereto, are of a size suitable for use as a fuel cell catalyst (e.g., no greater than about 20 nm, about 10 nm, about 5 nm (50 Å), about 3 nm (30 Å), about 2 (20 Å) nm, in size or smaller). As set forth above, control of the alloy deposit size may be accomplished, at least in part, by maintaining a well-impregnated and uniformly distributed suspension throughout the removal of heat from the system. Additionally, the control of the deposit size may be accomplished by rapidly removing heat from the dispersion/suspension as the compound or compounds are depositing on supports.

The rapid heat removal may be accomplished by cooling the dispersion/suspension from a temperature of at least about 20° C. to a temperature below the freezing point of the solvent at a rate of, for example, at least about 20° C./minute. In order of increasing preference, heat removal may comprise cooling the dispersion/suspension at a rate of at least about 50, 60, 70, 80, 90, or 100° C./minute. As such, the dispersion/suspension may be cooled at a rate that is between about 50 and about 100° C./minute, or at a rate that is between about 60 and about 80° C./minute. Typically, removal of heat is at a rate that allows for the temperature of the suspension to be reduced from a temperature such as room temperature (about 20° C.) or higher (e.g., about 100° C.) to the freezing point of the solution or solvent within a relatively short period of time (e.g., not more than about 10, 5, or 3 minutes).

The heat may be removed from the dispersion/suspension by any appropriate method. For example, a container containing a volume of the dispersion/suspension may be placed within a refrigeration unit such as freeze-dryer, a volume of dispersion/suspension may be contacted with a cooled surface (e.g., a plate or container), a volume of dispersion/suspension in a container may be immersed in, or otherwise contacted with, a cryogenic liquid. Advantageously, the same container may also be used during the formation of the dispersion and/or during the separation of solvent from deposited supports. In one embodiment a cover is placed over an opening of the container. Although the cover may completely prevent the escape of any solid matter from the container, the cover preferably allows for a gas to exit the container while substantially preventing the supports from exiting the container. An example of such a cover includes a stretchable film (e.g., PARAFILM) having holes that are, for example, less than about 500, 400, or 300 μm in size (maximum length across the hole).

In one embodiment the dispersion/suspension is cooled at a rate of at least about 20° C./minute by immersing or contacting a container containing the dispersion/suspension in or with a volume of cryogenic liquid within a cryogenic container sized and shaped so that at least a substantial portion of its surface is contacted with the cryogenic liquid (e.g., at least about 50, 60, 70, 80, or 90 percent of the surface of the dispersion/suspension container). The cryogenic liquid is typically at a temperature that is at least about 20° C. below the freezing point of the solvent. Examples of suitable cryogenic liquids typically include liquid nitrogen, liquid helium, liquid argon, but even less costly media may be utilized (for example, an ice water/hydrous calcium chloride mixture can reach temperatures down to about −55° C., an acetone/dry ice mixture can reach temperatures down to about −78° C., and a diethyl ether/dry ice mixture can reach temperatures down to about −100° C.).

The container may be made of nearly any type of material. Generally, the selected material does not require special handling procedures, can withstand repeated uses without structural failure (e.g., resistant to thermal shock), does not contribute impurities to the suspension (e.g., resistant to chemical attack), and is thermally conductive. For example, plastic vials made from high density polyethylene may be used.

The supports having the deposits thereon may be separated from the solvent portion by any appropriate method such as filtration, evaporation (e.g., by spray-drying), sublimation (e.g., freeze-drying), or a combination thereof. The evaporation or sublimation rate may be enhanced by adding heat (e.g., raising the temperature of the solvent) and/or decreasing the atmospheric pressure to which the solvent is exposed.

In one embodiment a frozen or solidified suspension is freeze-dried to remove the solvent portion therefrom. The freeze-drying may be carried out in any appropriate apparatus, such as a LABCONCO FREEZE DRY SYSTEM (Model 79480). Intuitively, one of skill in the art would typically maintain the temperature of the frozen suspension below the melting point of the solvent (i.e., the solvent is removed by sublimation), in order to prevent agglomeration of the supports. The freeze-drying process described or illustrated herein may be carried out under such conditions. Surprisingly, however, it is not critical that the solvent portion remain fully frozen. Specifically, it has been discovered that a free-flowing, non-agglomerated powder may be prepared even if the solvent is allowed to melt, provided that the pressure within the freeze-dryer is maintained at a level that the evaporation rate of the liquid solvent is faster than the melting rate (e.g., below about 0.2 millibar, 0.000197 atm, or 20 Pa). Thus, there is typically not enough solvent in the liquid state to result in agglomeration of the supports. Advantageously, this can be used to decrease the time needed to remove the solvent portion. Removing the solvent portion results in a free-flowing, non-agglomerated supported powder that comprises the supports/particulate support and deposits comprising one or more metal species or precipitated metals on the supports/particulate support.

To accomplish the conversion of the deposited compound to the desired form of the metal therein, the powder is typically heated in a reducing atmosphere (e.g., an atmosphere containing hydrogen and/or an inert gas such as argon) at a temperature sufficient to decompose the deposited compound. The temperature reached during the thermal treatment is typically at least as high as the decomposition temperature(s) for the deposited compound(s) and not so high as to result in degradation of the supports and agglomeration of the supports and/or the catalyst deposits. Typically, the temperature is between about 60° C. and about 1100° C., between about 100 and about 1000° C., between about 200 and about 800° C., or between about 400 and about 600° C. Inorganic metal-containing compounds typically decompose at temperatures between about 600 and 1000° C.

The duration of the heat treatment is typically at least sufficient to substantially convert the deposited compounds to the desired state. In general, the temperature and time are inversely related (i.e., conversion is accomplished in a shorter period of time at higher temperatures and vice versa). At the temperatures typical for converting the inorganic metal-containing compounds to an alloy set forth above, the duration of the heat treatment is typically at least about 30 minutes (e.g., about 1, 2, 4, 6, 8, 10, 12 hours, or longer). For example, the duration may be between about 1 and about 14 hours, about 2 and about 12 hours, or between about 4 and about 6 hours.

Referring to FIG. 1, a carbon supported catalyst alloy powder particle 1 of the present invention, produced in accordance with the freeze-drying method described or illustrated herein, comprises a carbon support 2 and deposits 3 of the catalyst alloy on the support. A particle and a powder comprising said particles may have a loading that is up to about 90 weight percent. However, when a supported catalyst powder is used as a fuel cell catalyst, the loading is typically between about 5 and about 60 weight percent, and is preferably between about 15 and about 45 or about 55 weight percent, or more preferably between about 20 and about 40 or 50 weight percent (e.g., about 20 weight percent, 45 weight percent, or about 50 weight percent). Increasing the loading to greater than about 60 weight percent does not typically result in an increase in the activity. Without being held to a particular theory, it is believed that excess loading covers a portion of the deposited metal and the covered portion cannot catalyze the desired electrochemical reaction. On the other hand, the activity of the supported catalyst typically decreases significantly if the loading is below about 5 weight percent.

The freeze-dry method may be used to produce supported catalyst alloy powders that are heavily loaded with nanoparticle deposits of a catalyst alloy that comprises one or more non-noble metals, wherein the deposits have a relatively narrow size distribution. For example, in one embodiment the supported non-noble metal-containing catalyst alloy powder may have a metal loading of at least about 20 weight percent of the powder, an average deposit size that is no greater than about 10 nm, and a deposit size distribution in which at least about 70 percent of the deposits are within about 50 and 150 percent of the average deposit size. In another embodiment, the metal loading may preferably be between about 20 and about 60 weight percent, and more preferably between about 20 and about 40 weight percent.

The average size of the catalyst alloy deposits is typically no greater than about 5 nm (50 Å). Preferably, however, the average size of the catalyst alloy deposits is no greater than about 3 nm (30 Å), 2 nm (20 Å), or even 1 nm (10 Å). Alternatively, however, the average size of the metal alloy deposits may preferably be between about 3 nm and about 10 nm, or between about 5 nm and about 10 nm. Additionally, the size distribution of the deposits is preferably such that at least about 80 percent of the deposits are within about 75 and 125 percent of the average deposit size.

The freeze-dry method of preparing supported catalyst powders allows for improved control of the stoichiometry of the deposits because the suspension is preferably kept within a single container, the solution is not physically separated from the supports (e.g., by filtration), and freezing results in substantially all of the solute precipitating on the supports. Additionally, the deposits tend to be isolated, small, and uniformly dispersed over the surface of the supports, thereby increasing the overall catalytic activity. Still further, because filtering is not necessary, extremely fine particles are not lost and the supported catalyst powders produced by this method tend to have a greater surface area and activity. Also, the act of depositing the metal species on the supports is fast. For example, immersing a container of the dispersion/suspension in a cryogenic liquid may solidify the dispersion/suspension in about three to four minutes.

4. Unsupported Catalyst Compositions in Electrode/Fuel Cell Applications

It is to be noted that, in another embodiment of the present invention, a catalyst composition (e.g., the catalyst composition comprising or consisting essentially of an alloy of the metal components), and/or the precursor thereto, may be unsupported; that is, a catalyst composition as set forth herein may be employed in the absence of support particles. More specifically, it is to be noted that in another embodiment of the present invention a catalyst composition comprising platinum, copper and nickel as defined herein may be directly deposited (e.g., sputtered) onto, for example: (i) a surface of one or both of the electrodes (e.g., the anode, the cathode or both), and/or (ii) one or both surfaces of a polyelectrolyte membrane, and/or (iii) some other surface, such as a backing for the membrane (e.g., carbon paper).

In this regard it is to be further noted that each constituent (e.g., metal-containing compound) of the composition may be deposited separately, each for example as a separate layer on the surface of the electrode, membrane, etc. Alternatively, two or more constituents may be deposited at the same time. Additionally, when the composition comprises or consists essentially of an alloy of these metals, the alloy may be formed and then deposited, or the constituents thereof may be deposited and then the alloy subsequently formed thereon.

Deposition of the constituent(s) may be achieved using means known in the art, including for example known sputtering techniques (see, e.g., PCT Application No. WO 99/16137, or U.S. Pat. No. 6,171,721 which is incorporated herein by reference). Generally speaking, however, in one approach sputter-deposition is achieved by creating, within a vacuum chamber in an inert atmosphere, a voltage differential between a target component material and the surface onto which the target constituent is to be deposited, in order to dislodge particles from the target constituent material which are then attached to the surface of, for example, an electrode or electrolyte membrane, thus forming a coating of the target constituent thereon. In one embodiment, the constituents are deposited on a polymeric electrolyte membrane, including for example (i) a copolymer membrane of tetrafluoroethylene and perfluoropolyether sulfonic acid (such as the membrane material sold under the trademark NAFION), (ii) a perfluorinated sulfonic acid polymer (such as the membrane material sold under the trademark ACIPLEX), (iii) polyethylene sulfonic acid polymers, (iv) polyketone sulfonic acids, (v) polybenzimidazole doped with phosphoric acid, (vi) sulfonated polyether sulfones, and (vii) other polyhydrocarbon-based sulfonic acid polymers.

It is to be noted that the specific amount of each metal or constituent of the composition may be controlled independently, in order to tailor the composition to a given application. In some embodiments, however, the amount of each deposited constituent, or alternatively the amount of the deposited catalyst (e.g., catalyst alloy), may be less than about 5 $mg/cm^2$ of surface area (e.g., electrode surface area, membrane surface area, etc.), less than about 1 $mg/cm^2$, less than about 0.5 $mg/cm^2$, less than about 0.1 $mg/cm^2$, or even less than about 0.05 $mg/cm^2$. In other embodiments, the amount of the deposited constituent, or alternatively the amount of the deposited catalyst (e.g., catalyst alloy), may range from about 0.5 $mg/cm^2$ to less than about 5 $mg/cm^2$, or from about 0.1 $mg/cm^2$ to less than about 1 $mg/cm^2$.

It is to be further noted that the specific amount of each constituent, or the composition, and/or the conditions under which the constituent, or composition, are deposited, may be controlled in order to control the resulting thickness of the constituent, or composition, layer on the surface of the electrode, electrolyte membrane, etc. For example, as determined by means known in the art (e.g., scanning electron microscopy or Rutherford back scattering spectrophotometric method), the deposited layer of the constituent or composition may have a thickness ranging from several angstroms (e.g., about 2, 4, 6, 8, 10 Å or more) to several tens of angstroms (e.g., about 20, 40, 60, 80, 100 Å or more), up to several hundred angstroms (e.g., about 200, 300, 400, 500 Å or more). Additionally, after all of the constituents have been deposited, and optionally alloyed (or, alternatively, after the composition has been deposited, and optionally alloyed), the layer of the composition of the present invention may have a thickness ranging from several tens of angstroms (e.g., about 20, 40, 60, 80, 100 Å or more), up to several hundred angstroms (e.g., about 200, 400, 600, 800, 1000, 1500 Å or more). Thus, in different embodiments the thickness may be, for example, between about 10 and about 500 angstroms (Å), between about 20 and about 200 angstroms (Å), and between about 40 and about 100 angstroms (Å).

It is to be still further noted that in embodiments wherein a composition (or the constituents thereof) is deposited as a thin film on the surface of, for example, an electrode or electrolyte membrane, the various concentration of platinum, copper and nickel therein may be as previously described herein. Additionally, in other embodiments, the concentration of platinum, copper and nickel in the composition may be other than as previously described.

5. Incorporation of the Composition in a Fuel Cell

Figure 2:
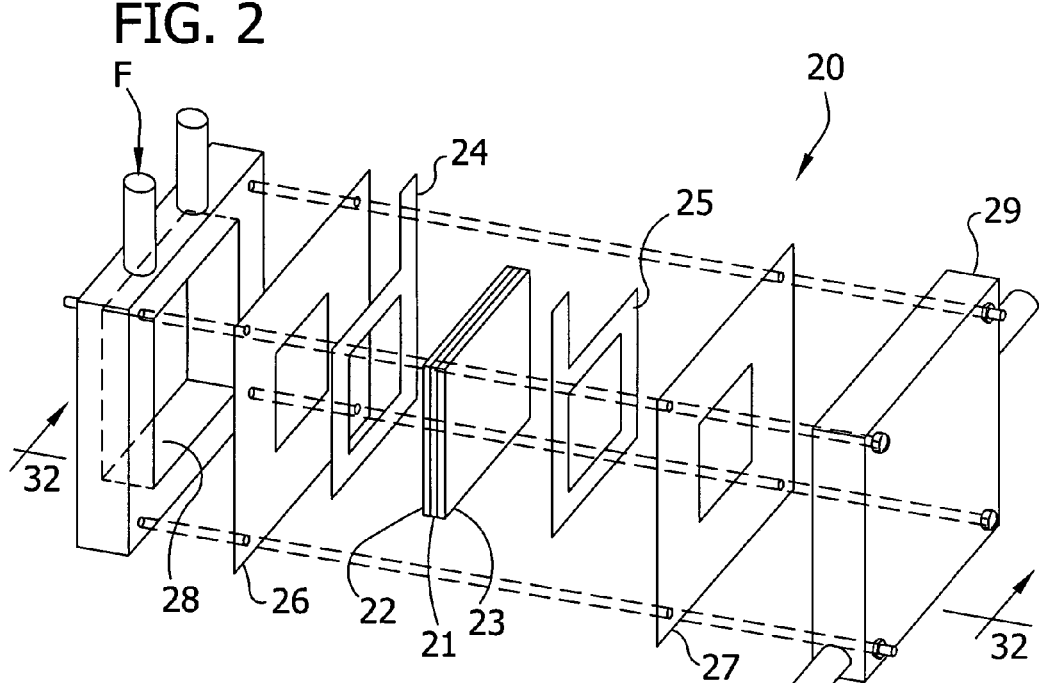
FIG. 2 is an exploded, schematic structural view showing members of a fuel cell.
Figure 3:
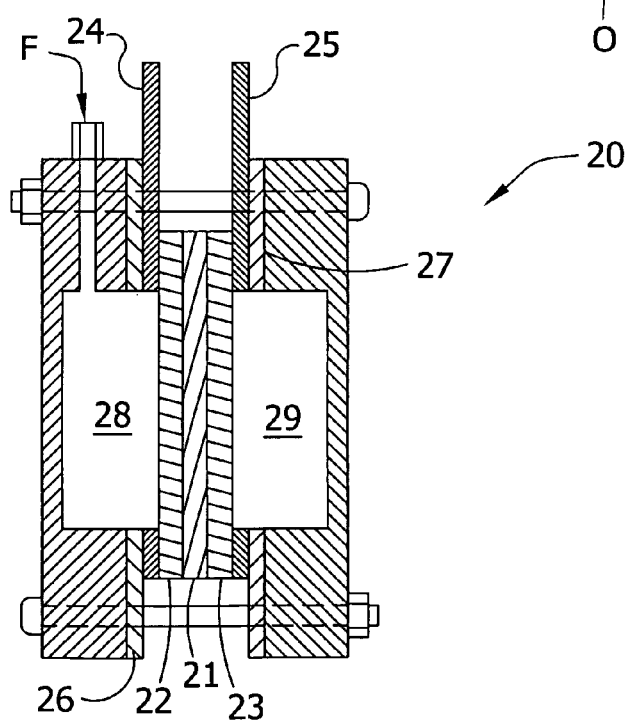
FIG. 3 is cross-sectional view of the assembled fuel cell of FIG. 2.

The compositions of the present invention are particularly suited for use as catalysts in proton exchange membrane fuel cells. As shown in FIGS. 2 and 3, a fuel cell, generally indicated at 20, comprises a fuel electrode (anode) 22 and an air electrode/oxidizer electrode (cathode) 23. In between the electrodes 22 and 23, a proton exchange membrane 21 serves as an electrolyte and is usually a strongly acidic ion exchange membrane, such as a perfluorosulphonic acid-based membrane. Preferably, the proton exchange membrane 21, the anode 22, and the cathode 23 are integrated into one body to minimize contact resistance between the electrodes and the proton exchange membrane. Current collectors 24 and 25 engage the anode and the cathode, respectively. A fuel chamber 28 and an air chamber 29 contain the respective reactants and are sealed by sealants 26 and 27, respectively.

In general, electricity is generated by hydrogen-containing fuel combustion (i.e., the hydrogen-containing fuel and oxygen react to form water, carbon dioxide and electricity). This is accomplished in the above-described fuel cell by introducing the hydrogen-containing fuel F into the fuel chamber 28, while oxygen O (preferably air) is introduced into the air chamber 29, whereby an electric current can be immediately transferred between the current collectors 24 and 25 through an outer circuit (not shown). Ideally, the hydrogen-containing fuel is oxidized at the anode 22 to produce hydrogen ions, electrons, and possibly carbon dioxide gas. The hydrogen ions migrate through the strongly acidic proton exchange membrane 21 and react with oxygen and electrons transferred through the outer circuit to the cathode 23 to form water. If the hydrogen-containing fuel F is methanol, it is preferably introduced as a dilute acidic solution to enhance the chemical reaction, thereby increasing power output (e.g., a 0.5 M methanol/0.5 M sulfuric acid solution).

To prevent the loss of ionic conduction in the proton exchange membranes, these typically remain hydrated during operation of the fuel cell. As a result, the material of the proton exchange membrane is typically selected to be resistant to dehydration at temperatures up to between about 100 and about 120° C. Proton exchange membranes usually have reduction and oxidation stability, resistance to acid and hydrolysis, sufficiently low electrical resistivity (e.g., <10Ω·cm), and low hydrogen or oxygen permeation. Additionally, proton exchange membranes are usually hydrophilic. This ensures proton conduction (by reversed diffusion of water to the anode), and prevents the membrane from drying out thereby reducing the electrical conductivity. For the sake of convenience, the layer thickness of the membranes is typically between 50 and 200 µm. In general, the foregoing properties are achieved with materials that have no aliphatic hydrogen-carbon bonds, which, for example, are achieved by replacing hydrogen with fluorine or by the presence of aromatic structures; the proton conduction results from the incorporation of sulfonic acid groups (high acid strength). Suitable proton-conducting membranes also include perfluorinated sulfonated polymers such as NAFION and its derivatives produced by E.I. du Pont de Nemours & Co., Wilmington, Del. NAFION is based on a copolymer made from tetrafluoroethylene and perfluorovinylether, and is provided with sulfonic groups working as ion-exchanging groups. Other suitable proton exchange membranes are produced with monomers such as perfluorinated compounds (e.g., octafluorocyclobutane and perfluorobenzene), or even monomers with C—H bonds that do not form any aliphatic H atoms in a plasma polymer, which could constitute attack sites for oxidative breakdown.

The electrodes of the present invention comprise the catalyst compositions of the present invention and an electrode substrate upon which the catalyst is deposited. In one embodiment, the composition is directly deposited on the electrode substrate. In another embodiment, the composition is supported on electrically conductive supports and the supported composition is deposited on the electrode substrate. The electrode may also comprise a proton conductive material that is in contact with the composition. The proton conductive material may facilitate contact between the electrolyte and the composition, and may thus enhance fuel cell performance. Preferably, the electrode is designed to increase cell efficiency by enhancing contact between the reactant (i.e., fuel or oxygen), the electrolyte and the composition. In particular, porous or gas diffusion electrodes are typically used since they allow the fuel/oxidizer to enter the electrode from the face of the electrode exposed to the reactant gas stream (back face), and the electrolyte to penetrate through the face of the electrode exposed to the electrolyte (front face), and reaction products, particularly water, to diffuse out of the electrode.

Preferably, the proton exchange membrane, electrodes, and catalyst composition are in contact with each other. This is typically accomplished by depositing the composition either on the electrode, or on the proton exchange membrane, and then placing the electrode and membrane in contact. The composition of this invention can be deposited on either the electrode or the membrane by a variety of methods, including plasma deposition, powder application (the powder may also be in the form of a slurry, a paste, or an ink), chemical plating, and sputtering. Plasma deposition generally entails depositing a thin layer (e.g., between 3 and 50 µm, preferably between 5 and 20 µm) of a catalyst composition on the membrane using low-pressure plasma. By way of example, an organic platinum compound such as trimethylcyclopentadienyl-platinum is gaseous between $10^{-4}$ and 10 mbar and can be excited using radio-frequency, microwaves, or an electron cyclotron resonance transmitter to deposit platinum on the membrane. According to another procedure, a catalyst powder, for example, is distributed onto the proton exchange membrane surface and integrated at an elevated temperature under pressure. If, however, the amount of catalyst powder exceeds about 2 mg/cm$^2$, the inclusion of a binder such as polytetrafluoroethylene is common. Further, the catalyst may be plated onto dispersed small support particles (e.g., the size is typically between 20 and 200 Å, and more preferably between about 20 and 100 Å). This increases the catalyst surface area, which in turn increases the number of reaction sites leading to improved cell efficiency. In one such chemical plating process, for example, a powdery carrier material such as conductive carbon black is contacted with an aqueous solution or aqueous suspension (slurry) of compounds of metallic components constituting the alloy to permit adsorption or impregnation of the metallic compounds or their ions on or in the carrier. Then, while the slurry is stirred at high speed, a dilute solution of suitable fixing agent such as ammonia, hydrazine, formic acid, or formalin is slowly added dropwise to disperse and deposit the metallic components on the carrier as insoluble compounds or partly reduced fine metal particles.

The loading, or surface concentration, of a composition on the membrane or electrode is based in part on the desired power output and cost for a particular fuel cell. In general, power output increases with increasing concentration; however, there is a level beyond which performance is not improved. Likewise, the cost of a fuel cell increases with increasing concentration. Thus, the surface concentration of composition is selected to meet the application requirements. For example, a fuel cell designed to meet the requirements of a demanding application such as an extraterrestrial vehicle will usually have a surface concentration of the composition sufficient to maximize the fuel cell power output. For less demanding applications, economic considerations dictate that the desired power output be attained with as little of the composition as possible. Typically, the loading of composition is between about 0.01 and about 6 mg/cm$^2$. Experimental results to-date indicate that in some embodiments the composition loading is preferably less than about 1 mg/cm$^2$, and more preferably between about 0.1 and 1 mg/cm$^2$.

To promote contact between the collector, electrode, composition and membrane, the layers are usually compressed at high temperature. The housings of the individual fuel cells are configured in such a way that a good gas supply is ensured, and at the same time the product water can be discharged properly. Typically, several fuel cells are joined to form stacks, so that the total power output is increased to economically feasible levels.

In general, the catalyst compositions and fuel cell electrodes of the present invention may be used to electrocatalyze any fuel containing hydrogen (e.g., hydrogen and reformed-hydrogen fuels). Also, hydrocarbon-based fuels may be used including: saturated hydrocarbons, such as methane (natural gas), ethane, propane and butane; garbage off-gas; oxygenated hydrocarbons, such as methanol and ethanol; fossil fuels, such as gasoline and kerosene; and, mixtures thereof.

To achieve the full ion-conducting property of proton exchange membranes, in some embodiments suitable acids (gases or liquids) are typically added to the fuel. For example, $SO_2$, $SO_3$, sulfuric acid, trifluoromethanesulfonic acid or the fluoride thereof, also strongly acidic carboxylic acids such as trifluoroacetic acid, and volatile phosphoric acid compounds may be used ("Ber. Bunsenges. Phys. Chem.", Volume 98 (1994), pages 631 to 635).

6. Fuel Cell Uses

As set forth above, the compositions of the present invention are useful as catalysts in fuel cells that generate electrical energy to perform useful work. For example, the compositions may be used in fuel cells which are in: electrical utility power generation facilities; uninterrupted power supply devices; extraterrestrial vehicles; transportation equipment, such as heavy trucks, automobiles, and motorcycles (see, Fuji et al., U.S. Pat. No. 6,048,633; Shinkai et al., U.S. Pat. No. 6,187,468; Fuji et al., U.S. Pat. No. 6,225,011; and Tanaka et al., U.S. Pat. No. 6,294,280); residential power generation systems; mobile communications equipment such as wireless telephones, pagers, and satellite phones (see, Prat et al., U.S. Pat. No. 6,127,058 and Kelley et al., U.S. Pat. No. 6,268,077); mobile electronic devices such as laptop computers, personal data assistants, audio recording and/or playback devices, digital cameras, digital video cameras, and electronic game playing devices; military and aerospace equipment such as global positioning satellite devices; and, robots.

7. Definitions

Activity is defined as the maximum sustainable, or steady state, current (Amps) obtained from the electrocatalyst, when fabricated into an electrode, at a given electric potential (Volts). Additionally, because of differences in the geometric area of electrodes, when comparing different electrocatalysts, activity is often expressed in terms of current density ($A/cm^2$).

An alloy may be described as a solid solution in which the solute and solvent atoms (the term solvent is applied to the metal that is in excess) are arranged at random, much in the same way as a liquid solution may be described. If some solute atoms replace some of those of the solvent in the structure of the latter, the solid solution may be defined as a substitutional solid solution. Alternatively, an interstitial solid solution is formed if a smaller atom occupies the interstices between the larger atoms. Combinations of the two types are also possible. Furthermore, in certain solid solutions, some level of regular arrangement may occur under the appropriate conditions resulting in a partial ordering that may be described as a superstructure. If long-range ordering of atoms occurs, the alloy may be described as crystallographically ordered, or simply ordered. These alloys may have characteristics that may be distinguishable through characterization techniques such as XRD. Significant changes in XRD may be apparent due to changes in symmetry. Although the global arrangement of the metal atoms may be similar in the case of a solid solution and an ordered alloy, the relationship between the specific locations of the metal A and metal B atoms is now ordered, not random, resulting in different diffraction patterns. Further, a homogeneous alloy is a single compound comprising the constituent metals. A heterogeneous alloy comprises an intimate mixture of individual metals and/or metal-containing compounds. An alloy, as defined herein, is also meant to include materials which may comprise elements which are generally considered to be non-metallic. For example, some alloys of the present invention may comprise oxygen and/or carbon in an amount that is generally considered to be a low or impurity level (see, e.g., Structural Inorganic Chemistry, A. F. Wells, Oxford University Press, 5th Edition, 1995, chapter 29).

8. Examples

Example 1

Forming Catalysts on Individually Addressable Electrodes

The catalyst compositions set forth in Tables A-G, infra, were prepared using the combinatorial techniques disclosed in Warren et al., U.S. Pat. No. 6,187,164; Wu et al., U.S. Pat. No. 6,045,671; Strasser, P., Gorer, S. and Devenney, M., *Combinatorial Electrochemical Techniques For The Discovery of New Fuel-Cell Cathode Materials*, Nayayanan, S. R., Gottesfeld, S. and Zawodzinski, T., eds., Direct Methanol Fuel Cells, Proceedings of the Electrochemical Society, New Jersey, 2001, p.191; and Strasser, P., Gorer, S. and Devenney, M., *Combinatorial Electrochemical Strategies For The Discovery of New Fuel-Cell Electrode Materials*, Proceedings of the International Symposium on Fuel Cells for Vehicles, 41 st Battery Symposium, The Electrochemical Society of Japan, Nagoya 2000, p. 153. For example, an array of independent electrodes (with areas of between about 1 and 3 $mm^2$) was fabricated on inert substrates (e.g., glass, quartz, sapphire, alumina, plastics, and thermally treated silicon). The individual electrodes were located substantially in the center of the substrate, and were connected to contact pads around the periphery of the substrate with wires. The electrodes, associated wires, and contact pads were fabricated from a conducting material (e.g., titanium, gold, silver, platinum, copper or other commonly used electrode materials).

Specifically, the catalyst compositions set forth in Tables A-G were prepared using a photolithography/RF magnetron sputtering technique (GHz range) to deposit a thin film of the catalysts on arrays of 64 individually addressable electrodes. A quartz insulating substrate was provided and photolithographic techniques were used to design and fabricate the electrode patterns on it. By applying a predetermined amount of photoresist to the substrate, photolyzing pre-selected regions of the photoresist, removing those regions that have been photolyzed (e.g., by using an appropriate developer), depositing a layer of titanium about 500 nm thick using RF magnetron sputtering over the entire surface and removing predetermined regions of the deposited titanium (e.g. by dissolving the underlying photoresist), intricate patterns of individually addressable electrodes were fabricated on the substrate.

Figure 4:
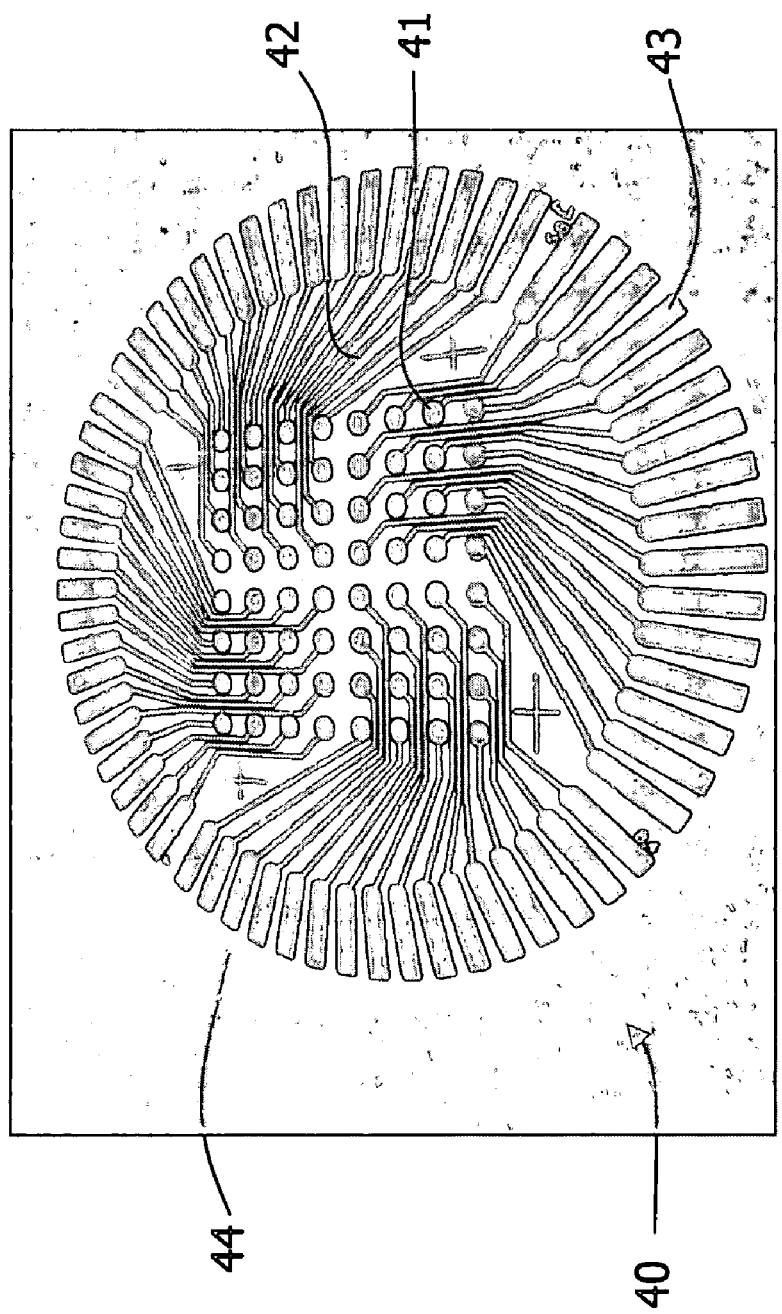
FIG. 4 is a photograph of an electrode array comprising thin film catalyst compositions deposited on individually addressable electrodes, in accordance with the present invention.

Referring to FIG. 4, the fabricated array 40 consisted of 64 individually addressable electrodes 41 (about 1.7 mm in diameter) arranged in an 8×8 square that were isolated from each other (by adequate spacing) and from the substrate 44 (fabricated on an insulating substrate), and whose interconnects 42 and contact pads 43 were insulated from the electrochemical testing solution (by hardened photoresist or other suitable insulating material).

After the initial array fabrication and prior to deposition of the catalyst for screening, a patterned insulating layer covering the wires and an inner portion of the peripheral contact pads was deposited, leaving the electrodes and the outer portion of the peripheral contact pads exposed (preferably approximately half of the contact pad is covered with this insulating layer). Because of the insulating layer, it is possible to connect a lead (e.g., a pogo pin or an alligator clip) to the outer portion of a given contact pad and address its associated electrode while the array is immersed in solution, without having to worry about reactions that can occur on the wires or peripheral contact pads. The insulating layer was a hardened photoresist, but any other suitable material known to be insulating in nature could have been used (e.g., glass, silica, alumina, magnesium oxide, silicon nitride, boron nitride, yttrium oxide, or titanium dioxide).

Following the creation of the titanium electrode array, a steel mask having 64 holes (1.7 mm in diameter) was pressed onto the substrate to prevent deposition of sputtered material onto the insulating resist layer. The deposition of the catalyst was also accomplished using RF magnetron sputtering and a two shutter masking system as described by Wu et al. which enable the deposition of material onto 1 or more electrodes at a time. Each individual thin film catalyst was created by a super lattice deposition method. For example, when preparing a catalyst composition consisting essentially of metals M1, M2 and M3, each is deposited onto an electrode, and partially or fully alloyed with the other metals thereon. More specifically, first a metal M1 sputter target is selected and a thin film of M1 having a defined thickness is deposited on the electrode. This initial thickness is typically from about 3 to about 12 Å. After this, metal M2 is selected as the sputter target and a layer of M2 is deposited onto the layer of M1. The thickness of M2 layer is also from about 3 to about 12 Å. The thicknesses of the deposited layers are in the range of the diffusion length of the metal atoms (e.g., about 10 to about 30 Å) which allows in-situ alloying of the metals. Then, a layer of M3 is deposited onto the M1-M2 alloy forming a M1-M2-M3 alloy film. As a result of the three deposition steps, an alloy thin film (9-36 Å thickness) of the desired stoichiometry is created. This concludes one deposition cycle. In order to achieve the desired total thickness of a catalyst material, deposition cycles are repeated as necessary which results in the creation of a super-lattice structure of a defined total thickness (typically about 700 Å). Although the number, thickness (stoichiometry) and order of application of the individual metal layers may be determined manually, it is desirable to utilize a computer program to design an output file which contains the information necessary to control the operation of the sputtering device during the preparation of a particular library wafer (i.e., array). One such computer program is the LIBRARY STUDIO software available from Symyx Technologies, Inc. of Santa Clara, Calif. and described in European Patent No. 1080435 B1. The compositions of several as-sputtered alloys were analyzed using Electron Dispersive Spectroscopy (EDS) to confirm that they were consistent with desired compositions (chemical compositions determined using EDS are within about 5% of the actual composition).

Arrays were prepared to evaluate the specific alloy compositions set forth in Tables A-G, below. For the arrays of Tables A-C, each had one electrode that consisted essentially of platinum, which served as an internal standard for the screening of the alloys on that array. For the arrays of Tables D-G, an internal platinum standard electrode was not present. Rather, these samples were evaluated against an external platinum standard comprising an array of 64 platinum electrodes (to determine the experimental error of the oxygen reduction test) in which the oxygen reduction activity of the 64 platinum electrodes averaged −0.75 mA/cm² at +0.1V vs. a mercury/mercury sulfate electrode.

TABLE A

[Lib. 133802]

| Electrode Number | End Current Density (Absolute Activity) mA/cm² | End Current Density per Weight Fraction of Pt mA/cm² | Relative Activity Compared to Internal Pt | Pt at % | Ni at % | Cu at % | Weight Fraction of Pt |
|---|---|---|---|---|---|---|---|
| 4 | −0.24 | −0.53 | 0.32 | 20 | 40 | 40 | 0.44 |
| 6 | −1.44 | −2.13 | 1.96 | 40 | 20 | 40 | 0.68 |
| 36 | −1.15 | −1.69 | 1.56 | 40 | 40 | 20 | 0.68 |
| 38 | −0.97 | −1.17 | 1.31 | 60 | 20 | 20 | 0.83 |
| 43 | −0.74 | −1.46 | 1.00 | 25 | 12 | 63 | 0.51 |
| 44 | −0.82 | −1.71 | 1.11 | 22 | 56 | 22 | 0.48 |
| 46 | −1.18 | −1.64 | 1.59 | 45 | 33 | 22 | 0.72 |
| 48 | −0.95 | −1.10 | 1.29 | 67 | 11 | 22 | 0.86 |
| 56 | −0.74 | −0.74 | 1 | 100 | 0 | 0 | 1 |

TABLE B

[Lib. 133803]

| Electrode Number | End Current Density (Absolute Activity) mA/cm² | End Current Density per Weight Fraction of Pt mA/cm² | Relative Activity Compared to Internal Pt | Pt at % | Ni at % | Cu at % | Weight Fraction of Pt |
|---|---|---|---|---|---|---|---|
| 4 | −0.05 | −0.11 | 0.07 | 20 | 40 | 40 | 0.44 |
| 6 | −0.84 | −1.25 | 1.11 | 40 | 20 | 40 | 0.68 |
| 36 | −0.90 | −1.31 | 1.18 | 40 | 40 | 20 | 0.68 |
| 38 | −0.80 | −0.97 | 1.05 | 60 | 20 | 20 | 0.83 |
| 43 | −1.30 | −2.55 | 1.71 | 25 | 13 | 62 | 0.51 |
| 44 | −0.19 | −0.39 | 0.25 | 22 | 56 | 22 | 0.48 |
| 46 | −0.93 | −1.29 | 1.22 | 45 | 33 | 22 | 0.72 |
| 48 | −0.85 | −0.98 | 1.12 | 67 | 11 | 22 | 0.86 |
| 56 | −0.76 | −0.76 | 1 | 100 | 0 | 0 | 1 |

TABLE C

[Lib. 139107]

| Electrode Number | End Current Density (Absolute Activity) mA/cm² | End Current Density per Weight Fraction of Pt mA/cm² | Relative Activity Compared to Internal Pt | Pt at % | Ni at % | Cu at % | Weight Fraction of Pt |
|---|---|---|---|---|---|---|---|
| 29 | −5.80 | −12.99 | 8.58 | 20 | 50 | 30 | 0.45 |
| 30 | −0.62 | −0.81 | 0.91 | 50 | 10 | 40 | 0.76 |
| 37 | −5.19 | −11.56 | 7.67 | 20 | 60 | 20 | 0.45 |
| 38 | −0.66 | −0.87 | 0.98 | 50 | 20 | 30 | 0.76 |
| 33 | −4.69 | −10.68 | 6.93 | 20 | 20 | 60 | 0.44 |
| 25 | −4.29 | −9.82 | 6.34 | 20 | 10 | 70 | 0.44 |
| 7 | −4.24 | −9.65 | 6.27 | 20 | 20 | 60 | 0.44 |
| 8 | −0.67 | −0.75 | 6.27 | 70 | 20 | 10 | 0.88 |
| 5 | −4.06 | −8.99 | 6.00 | 20 | 70 | 10 | 0.45 |
| 39 | −4.03 | −9.22 | 5.96 | 20 | 10 | 70 | 0.44 |
| 40 | −0.58 | −0.66 | 0.86 | 70 | 10 | 20 | 0.88 |
| 9 | −3.71 | −8.36 | 5.49 | 20 | 40 | 40 | 0.44 |
| 10 | −0.58 | −0.76 | 0.86 | 50 | 30 | 20 | 0.76 |
| 1 | −3.52 | −7.98 | 5.21 | 20 | 30 | 50 | 0.44 |
| 2 | −0.61 | −0.80 | 0.90 | 50 | 20 | 30 | 0.76 |
| 15 | −3.09 | −7.01 | 4.58 | 20 | 30 | 50 | 0.44 |
| 57 | −2.56 | −4.44 | 3.79 | 30 | 30 | 40 | 0.58 |
| 58 | −0.67 | −0.81 | 0.99 | 60 | 20 | 20 | 0.83 |
| 35 | −2.15 | −3.69 | 3.18 | 30 | 50 | 20 | 0.58 |
| 27 | −2.06 | −3.55 | 3.04 | 30 | 40 | 30 | 0.58 |

TABLE C-continued

[Lib. 139107]

| Electrode Number | End Current Density (Absolute Activity) mA/cm$^2$ | End Current Density per Weight Fraction of Pt mA/cm$^2$ | Relative Activity Compared to Internal Pt | Pt at % | Ni at % | Cu at % | Weight Fraction of Pt |
|---|---|---|---|---|---|---|---|
| 3  | −1.94 | −3.32 | 2.87 | 30  | 60 | 10 | 0.58 |
| 63 | −1.67 | −2.91 | 2.47 | 30  | 20 | 50 | 0.57 |
| 17 | −1.63 | −2.86 | 2.41 | 30  | 10 | 60 | 0.57 |
| 21 | −1.59 | −2.74 | 2.36 | 30  | 50 | 20 | 0.58 |
| 22 | −0.63 | −0.76 | 0.93 | 60  | 10 | 30 | 0.82 |
| 49 | −0.93 | −1.37 | 1.37 | 40  | 10 | 50 | 0.67 |
| 4  | −0.82 | −1.21 | 1.22 | 40  | 20 | 40 | 0.68 |
| 53 | −0.82 | −1.20 | 1.21 | 40  | 50 | 10 | 0.69 |
| 19 | −0.75 | −1.10 | 1.12 | 40  | 40 | 20 | 0.68 |
| 36 | −0.75 | −1.11 | 1.11 | 40  | 10 | 50 | 0.67 |
| 12 | −0.74 | −1.09 | 1.10 | 40  | 30 | 30 | 0.68 |
| 41 | −0.73 | −0.97 | 1.09 | 50  | 10 | 40 | 0.76 |
| 46 | −0.62 | −0.67 | 0.92 | 80  | 10 | 10 | 0.93 |
| 34 | −0.73 | −0.96 | 1.07 | 50  | 10 | 40 | 0.76 |
| 54 | −0.71 | −0.81 | 1.05 | 70  | 10 | 20 | 0.88 |
| 62 | −0.70 | −0.85 | 1.04 | 60  | 30 | 10 | 0.83 |
| 51 | −0.69 | −0.90 | 1.02 | 50  | 40 | 10 | 0.77 |
| 60 | −0.69 | −0.90 | 1.01 | 50  | 20 | 30 | 0.76 |
| 14 | −0.69 | −0.90 | 1.01 | 50  | 40 | 10 | 0.77 |
| 6  | −0.68 | −0.89 | 1.00 | 50  | 30 | 20 | 0.76 |
| 48 | −0.68 | −0.68 | 1.00 | 100 | 0  | 0  | 1.00 |

TABLE D

[Lib. 143377]

| Electrode Number | End Current Density (Absolute Activity) mA/cm$^2$ | End Current Density per Weight Fraction of Pt mA/cm$^2$ | Pt at % | Ni at % | Cu at % | Weight Fraction of Pt |
|---|---|---|---|---|---|---|
| 25 | −1.87 | −3.23 | 30 | 40 | 30 | 0.58 |
| 27 | −1.39 | −2.04 | 40 | 40 | 20 | 0.68 |
| 30 | −1.32 | −1.81 | 45 | 40 | 15 | 0.73 |
| 31 | −1.47 | −2.32 | 35 | 40 | 25 | 0.63 |
| 41 | −1.23 | −2.37 | 25 | 50 | 25 | 0.52 |
| 45 | −1.58 | −2.48 | 35 | 50 | 15 | 0.64 |
| 46 | −1.36 | −1.98 | 40 | 50 | 10 | 0.69 |
| 47 | −1.68 | −2.89 | 30 | 50 | 20 | 0.58 |
| 49 | −1.14 | −2.20 | 25 | 45 | 30 | 0.52 |
| 51 | −1.61 | −2.53 | 35 | 45 | 20 | 0.64 |
| 54 | −1.46 | −2.13 | 40 | 45 | 15 | 0.68 |
| 55 | −1.82 | −3.13 | 30 | 45 | 25 | 0.58 |

TABLE E

[Lib. 143378]

| Electrode Number | End Current Density (Absolute Activity) mA/cm$^2$ | End Current Density per Weight Fraction of Pt mA/cm$^2$ | Pt at % | Ni at % | Cu at % | Weight Fraction of Pt |
|---|---|---|---|---|---|---|
| 25 | −1.56 | −2.71 | 30 | 40 | 30 | 0.58 |
| 27 | −1.44 | −2.11 | 40 | 40 | 20 | 0.68 |
| 30 | −1.64 | −2.26 | 45 | 40 | 15 | 0.73 |
| 31 | −1.53 | −2.41 | 35 | 40 | 25 | 0.63 |
| 41 | −1.88 | −3.63 | 25 | 50 | 25 | 0.52 |
| 43 | −1.53 | −2.41 | 35 | 50 | 15 | 0.64 |
| 46 | −1.49 | −2.17 | 40 | 50 | 10 | 0.69 |
| 47 | −1.74 | −3.00 | 30 | 50 | 20 | 0.58 |
| 49 | −1.80 | −3.47 | 25 | 45 | 30 | 0.52 |
| 51 | −1.55 | −2.44 | 35 | 45 | 20 | 0.64 |
| 54 | −1.51 | −2.20 | 40 | 45 | 15 | 0.68 |
| 55 | −1.64 | −2.82 | 30 | 45 | 25 | 0.58 |

TABLE F

[Lib. 143379]

| Electrode Number | End Current Density (Absolute Activity) mA/cm$^2$ | End Current Density per Weight Fraction of Pt mA/cm$^2$ | Pt at % | Ni at % | Cu at % | Weight Fraction of Pt |
|---|---|---|---|---|---|---|
| 25 | −1.43 | −2.47 | 30 | 40 | 30 | 0.58 |
| 27 | −1.27 | −1.86 | 40 | 40 | 20 | 0.68 |
| 30 | −1.20 | −1.66 | 45 | 40 | 15 | 0.73 |
| 31 | −1.28 | −2.03 | 35 | 40 | 25 | 0.63 |
| 41 | −1.72 | −3.31 | 25 | 50 | 25 | 0.52 |
| 43 | −1.35 | −2.11 | 35 | 50 | 15 | 0.64 |
| 46 | −1.28 | −1.87 | 40 | 50 | 10 | 0.69 |
| 47 | −1.48 | −2.55 | 30 | 50 | 20 | 0.58 |
| 49 | −2.00 | −3.86 | 25 | 45 | 30 | 0.52 |
| 51 | −1.44 | −2.27 | 35 | 45 | 20 | 0.64 |
| 54 | −1.37 | −2.00 | 40 | 45 | 15 | 0.68 |
| 55 | −1.50 | −2.58 | 30 | 45 | 25 | 0.58 |

TABLE G

[Lib. 143380]

| Electrode Number | End Current Density (Absolute Activity) mA/cm$^2$ | End Current Density per Weight Fraction of Pt mA/cm$^2$ | Pt at % | Ni at % | Cu at % | Weight Fraction of Pt |
|---|---|---|---|---|---|---|
| 25 | −0.86 | −0.86 | 30 | 40 | 30 | 0.58 |
| 27 | −0.82 | −0.82 | 40 | 40 | 20 | 0.68 |
| 30 | −0.78 | −0.78 | 45 | 40 | 15 | 0.73 |
| 31 | −0.86 | −0.86 | 35 | 40 | 25 | 0.63 |
| 41 | −1.01 | −1.01 | 25 | 50 | 25 | 0.52 |
| 43 | −0.86 | −0.88 | 35 | 50 | 15 | 0.64 |
| 46 | −0.77 | −0.78 | 40 | 50 | 10 | 0.69 |
| 47 | −0.93 | −0.93 | 30 | 50 | 20 | 0.58 |
| 49 | −1.28 | −1.27 | 25 | 45 | 30 | 0.52 |
| 51 | −0.78 | −0.78 | 35 | 45 | 20 | 0.64 |
| 54 | −0.83 | −0.82 | 40 | 45 | 15 | 0.68 |
| 55 | −0.97 | −0.97 | 30 | 45 | 25 | 0.58 |

Example 2

Screening Catalysts for Electrocatalytic Activity

The catalysts compositions set forth in Tables A and B that were synthesized on arrays according to the method set forth in Example 1 were screened for electrochemical reduction of molecular oxygen to water according to Protocol 1 (detailed below), to determine relative electrocatalytic activity against the internal and/or external platinum standard. Additionally, the catalyst compositions set forth in Tables C-G that were synthesized on arrays according to the method set forth in Example 1 were screened for electrochemical reduction of molecular oxygen to water according to Protocol 2 (detailed below) to determine electrocatalytic activity.

In general, the array wafers were assembled into an electrochemical screening cell and a screening device established an electrical contact between the 64 electrode catalysts (working electrodes) and a 64-channel potentiostat used for the screening. Specifically, each wafer array was placed into a screening device such that all 64 spots were facing upward and a tube cell body that was generally annular and having an inner diameter of about 2 inches (5 cm) was pressed onto the upward facing wafer surface. The diameter of this tubular cell was such that the portion of the wafer with the square electrode array formed the base of a cylindrical volume while the contact pads were outside the cylindrical volume. A liquid ionic solution (i.e., 0.5 M $H_2SO_4$ aqueous electrolyte) was poured into this cylindrical volume, and a common counter electrode (i.e., platinum gauze) and a common reference electrode (e.g., mercury/mercury sulfate reference electrode (MMS)) were placed into the electrolyte solution to close the electrical circuit.

A rotator shaft with blades was placed into the electrolyte to provide forced convection-diffusion conditions during the screening. The rotation rate was typically between about 300 to about 400 rpm. Depending on the screening experiment, either argon or pure oxygen was bubbled through the electrolyte during the measurements. Argon served to remove $O_2$ gas in the electrolyte to simulate $O_2$-free conditions used for the initial conditioning of the catalysts. The introduction of pure oxygen served to saturate the electrolyte with oxygen for the oxygen reduction reaction. During the screening, the electrolyte was maintained at 60° C. and the rotation rate was constant.

Protocol 1: Three groups of tests were performed to screen the activity of the catalysts. The electrolyte was purged with argon for about 20 minutes prior to the electrochemical measurements. The first group of tests comprised cyclic voltammetric measurements while purging the electrolyte with argon. Specifically, the first group of tests comprised:
  a. a potential sweep from open circuit potential (OCP) to about +0.3 V to about −0.63 V and back to about +0.3 V at a rate of about 20 mV/s;
  b. seventy-five consecutive potential sweeps from OCP to about +0.3 V to about −0.7 V and back to about +0.3 V at a rate of about 200 mV/s; and
  c. a potential sweep from OCP to about +0.3 V to about −0.63 V and back to about +0.3 V at a rate of about 20 mV/s.

The shape of the cyclic voltammetric (CV) profile of the internal Pt standard catalyst as obtained in test (c) was compared to an external standard CV profile obtained from a Pt thin film electrode that had been pretreated until a stable CV was obtained. If test (c) resulted in a similar cyclic voltammogram, the first group of experiments was considered completed. If the shape of the cyclic voltammogram of test (c) did not result in the expected standard Pt CV behavior, tests (b) and (c) were repeated until the Pt standard catalyst showed the desired standard voltammetric profile. In this way, it was ensured that the Pt standard catalyst showed a stable and well-defined oxygen reduction activity in subsequent experiments. The electrolyte was then purged with oxygen for approximately 30 minutes. The following second group of tests was performed while continuing to purge with oxygen:
  a. measuring the open circuit potential (OCP) for a minute; then, the potential was stepped to −0.4 V, held for a minute, and was then swept up to about +0.4 V at a rate of about 10 mV/s;
  b. measuring the OCP for a minute; then applying a potential step from OCP to about +0.1 V while measuring the current for about 5 minutes; and
  C. measuring the OCP for a minute; then applying a potential step from OCP to about +0.2 V while monitoring the current for about 5 minutes.

The third group of tests comprised a repeat of the second group of tests after about one hour from completion of the second group of tests. The electrolyte was continually stirred and purged with oxygen during the waiting period. All the foregoing test voltages are with reference to a mercury/mercury sulfate (MMS) electrode. Additionally, an external platinum standard comprising an array of 64 platinum electrodes was used to monitor the tests to ensure the accuracy and consistency of the oxygen reduction evaluation.

Protocol 2: Four groups of tests were performed to screen the activity of the catalysts. The first group is a pretreatment process, whereas the other three groups are identical sets of experiments in order to screen the oxygen reduction activity as well as the current electrochemical surface area of the catalysts. The electrolyte was purged with argon for about 20 minutes prior to the electrochemical measurements. The first group of tests comprised cyclic voltammetric measurements while purging the electrolyte with argon. Specifically, the first group of tests comprised:
  a. a potential sweep from open circuit potential (OCP) to about +0.3 V to about −0.63 V and back to about +0.3 V at a rate of about 20 mV/s;
  b. fifty consecutive potential sweeps from OCP to about +0.3 V to about −0.7 V and back to about +0.3 V at a rate of about 200 mV/s; and
  c. a potential sweep from OCP to about +0.3 V to about −0.63 V and back to about +0.3 V at a rate of about 20 mV/s.

After step (c) of the first group of tests, the electrolyte was purged with oxygen for approximately 30 minutes. Then, the following second group of tests was performed, which comprised a test in an oxygen-saturated solution (i.e., test (a)), followed by a test performed in an Ar-purged (i.e., an oxygen-free solution, test (b)):
  a. in an oxygen-saturated solution, the OCP was measured for a minute; a potential step was then applied from OCP to about −0.4 V; this potential was held for approximately 30 seconds, and then the potential was stepped to about +0.1 V while measuring the current for about 5 minutes; and
  b. after purging the electrolyte with Ar for approximately 30 minutes, a potential sweep was performed from open circuit potential (OCP) to about +0.3 V to about −0.63 V and back to about +0.3 V, at a rate of about 20 mV/s.

The third and fourth group of tests comprised a repeat of the second group of tests after completion. All the foregoing test voltages are with reference to a mercury/mercury sulfate (MMS) electrode. Additionally, an external platinum standard comprising an array of 64 platinum electrodes was used to monitor the tests to ensure the accuracy and consistency of the oxygen reduction evaluation.

The specific catalyst compositions set forth in Table A-G were prepared and screened in accordance with the above-described methods of Protocols 1 (Tables A and B) or 2 (Tables C-G), and the test results are set forth therein. The screening results in Tables A and B are for the third test group (steady state currents at +0.1 V MMS). The screening results in Tables C-G were taken from the oxygen reduction measurements of the fourth group of tests (i.e., the last screening in an oxygen-saturated solution), the Ar-saturated steps serving as an evaluation of additional catalyst-related parameters, such as surface area over time.

The current value reported (End Current Density) is the result of averaging the last three current values of the chronoamperometric test normalized for geometric surface area. It is to be noted, from the results presented in these Tables, that numerous compositions exhibited an oxygen reduction activity which exceeded, for example, the internal platinum standard (see, e.g., the catalyst compositions corresponding to Electrode Numbers, for example: 6, 46, 36, 38, 48 and 44 in Table A; 43, 46, 36, 48, 6 and 38 in Table B; and 29, 37, 33, 25, 7, 8, 5, 39, 9, 1, 15, 57, 35, 27, 3, 63, 17, 21, 49, 4, 53, 19, 36, 12, 41, 34, 54, 62, 51, 60 and 14 in Table C; internal platinum standards were not present for Tables D-G).

Example 3

Synthesis of Supported Catalysts

The synthesis of multiple Pt—Cu—Ni catalyst compositions (see Table H, Target Catalyst Comp., infra) on carbon support particles was attempted according to different process conditions, in order to evaluate the performance of the catalysts while in a state that is typically used in a fuel cell. To do so, the catalyst components were deposited or precipitated on supported platinum powder (i.e., platinum nanoparticles supported on carbon black particles). Platinum supported on carbon black is commercially available from companies such as Johnson Matthey, Inc., of New Jersey and E-Tek Div. of De-Nora, N.A., Inc., of Somerset, N.J. Such supported platinum powder is available with a wide range of platinum loading. The supported platinum powder used in this Example had a nominal platinum loading of about 20 or about 40 percent by weight, a platinum surface area of between about 150 and about 170 $m^2/g$ (determined by CO adsorption), a combined carbon and platinum surface area between about 350 and about 400 $m^2/g$ (determined by $N_2$ adsorption), and an average particle size of less than about 0.5 mm (determined by a sizing screen).

The catalyst compositions of Table H (infra) were formed on carbon support particles using a freeze-drying precipitation method. The freeze-drying method comprised forming an initial solution comprising the desired metal atoms in the desired concentrations. Each of the supported catalysts was prepared in an analogous manner, with variations being made in the amounts of metal-containing compounds used therein. For example, to prepare the target $Pt_{20}Cu_{30}Ni_{50}$ catalyst composition (e.g., HFC 823), having a final nominal platinum loading of about 15.51 percent by weight, 0.354 ml of a 0.5 M aqueous solution of $Cu(NO_3)_2.2.5H_2O$ and 0.590 ml of a 0.5 M aqueous solution of $Ni(NO_3)_2.6H_2O$ were mixed with about 2.055 ml $H_2O$, forming a green-blue clear solution. To prepare the target $Pt_{25}Cu_{65}Ni_{10}$ catalyst composition (e.g., HFC 1082), having a final nominal platinum loading of about 16.19 percent by weight, 0.307 ml of a 1.0 M aqueous solution of $Cu(NO_3)_2.2.5H_2O$ and 0.095 ml of a 0.5 M aqueous solution of $Ni(NO_3)_2.6H_2O$ mixed with about 2.598 ml $H_2O$, forming a green-blue clear solution. The solutions were introduced into quartz vials, each containing about 0.100 g of supported platinum powder having a nominal platinum loading of about 19.2 percent by weight, resulting in a black suspension. The suspensions were homogenized by immersing a probe of a BRANSON SONIFIER 150 into the vials and sonicating the mixtures for about 1.5 minutes at a power level of 3. The vials containing the homogenized suspensions were then immersed in a liquid nitrogen bath for about 3 minutes to solidify the suspensions. The solid suspensions were then freeze-dried for about 24 hours using a LABCONCO FREEZE DRY SYSTEM (Model 79480) to remove the solvent. The tray and the collection coil of the freeze dryer were maintained at about 27° C. and about −49° C., respectively, while evacuating the system (the pressure was maintained at about 0.05 mbar). After freeze-drying, the vials contained a powder comprising the supported platinum powder, as well as nickel and copper deposited thereon.

The recovered powders were then subjected to a heat treatment to reduce the constituents therein to their metallic state, and to fully or partially alloy the metals with each other and the platinum on the carbon black particles. One particular heat treatment comprised heating the powders in a quartz flow furnace with an atmosphere comprising about 6% $H_2$ and 94% Ar using a temperature profile of room temperature to about 90° C. at a rate of about 5° C./minute; holding at about 90° C. for 2 hours; increasing the temperature to about 200° C. at a rate of 5° C./minute; holding at about 200° C. for two hours; increasing the temperature at a rate of about 5° C./minute to a maximum temperature of, for example, about 600, 700, 800, 900, or 950° C.; holding at the maximum temperature for a duration of about 1.2, 2, 6, 7 or 10 hours (as indicated in Table H, infra); and, then cooling down to room temperature.

In order to determine the actual composition of the supported catalysts, the differently prepared catalysts (e.g., by composition variation or by heat treatment variation) were subjected to EDS (Electron Dispersive Spectroscopy) elemental analysis. For this technique, the sample powders were compressed into 6 mm diameter pellets with a thickness of about 1 mm. The target composition and actual composition for certain supported catalysts are set forth in Table H.

TABLE H

| Powder Name | Target Catalyst Comp. (at %) Pt | Cu | Ni | Max Alloying Temp for a duration °C. | hrs | Measured Catalyst Comp. before performing activity tests (at %) Pt | Cu | Ni | Target Pt loading (wt %) | Meas. loading (wt %) | Measured Catalyst Comp. after performing activity tests Pt | Cu | Ni | Target Log (Pt Mass Activity) @ +0.15 V MMS | Log (Pt Mass Activity) @ +0.15 V MMS | Target Pt Mass Activity [mA/mg Pt] @ +0.15 V MMS | Pt Mass Activity [mA/mg Pt] @ +0.15 V MMS | Target Relative perf. @ +0.15 V MMS (SCAN 1) | Relative perf. @ +0.15 V MMS | Target Relative perf. @ +0.15 V MMS (SCAN 2) | Target Relative perf. @ +0.15 V MMS (SCAN 3) | Catalyst Mass Activity [mA/mg catalyst] @ +0.8 V/RHE |
|---|---|---|---|---|---|---|---|---|---|---|---|---|---|---|---|---|---|---|---|---|---|---|
| HFC 10 | 100 | 0 | 0 | | | 100 | 0 | 0 | 37.80 | 37.8 | | | | 2.11 | 2.11 | 128.82 | 128.82 | 1.00 | 1.00 | | | 48.70 |
| HFC 477 | 20 | 30 | 50 | 600 | 7 | 25 | 29 | 46 | 15.50 | 14.2 | | | | 2.74 | 2.77 | 544.78 | 594.65 | 4.23 | 4.62 | | | 84.44 |
| HFC 478 | 30 | 20 | 50 | 600 | 7 | | | | 16.90 | | | | | 2.59 | | 386.67 | | 3.00 | | | | 65.35 |
| HFC 479 | 30 | 30 | 40 | 600 | 7 | | | | 16.80 | | | | | 2.61 | | 406.90 | | 3.16 | | | | 68.36 |
| HFC 483 | 20 | 30 | 50 | 900 | 1.2 | | | | 15.50 | | | | | 2.58 | | 381.36 | | 2.96 | | | | 59.11 |
| HFC 484 | 30 | 20 | 50 | 900 | 1.2 | | | | 16.90 | | | | | 2.31 | | 205.96 | | 1.60 | | | | 34.81 |
| HFC 485 | 30 | 30 | 40 | 900 | 1.2 | | | | 16.80 | | | | | 2.50 | | 318.24 | | 2.47 | | | | 53.46 |
| HFC 618 | 20 | 30 | 50 | 600 | 7 | | | | 15.30 | | | | | 2.73 | | 534.06 | | 4.15 | | | | 81.71 |
| HFC 619 | 20 | 35 | 45 | 600 | 7 | | | | 15.30 | | | | | 2.75 | | 564.44 | | 4.38 | | | | 86.36 |
| HFC 620 | 25 | 30 | 45 | 600 | 7 | | | | 16.10 | | | | | 2.67 | | 463.20 | | 3.60 | | | | 74.58 |
| HFC 622 | 20 | 30 | 50 | 600 | 7 | | | | 15.30 | | | | | 2.68 | | 481.78 | | 3.74 | | | | 73.71 |
| HFC 623 | 20 | 35 | 45 | 600 | 7 | | | | 15.30 | 14.7 | | | | 2.80 | 2.81 | 624.55 | 650.05 | 4.85 | 5.05 | | | 95.56 |
| HFC 624 | 25 | 30 | 45 | 600 | 7 | | | | 16.10 | | | | | 2.73 | | 539.13 | | 4.18 | | | | 86.80 |
| HFC 649 | 20 | 30 | 50 | 900 | 10 | 23 | 29 | 48 | 15.50 | 18.2 | | | | 2.78 | 2.71 | 595.66 | 507.30 | 4.62 | 3.94 | | | 92.33 |
| HFC 738 | 20 | 30 | 50 | 950 | 10 | | | | 15.37 | | 52 | 18 | 30 | 2.64 | | 436.52 | | 3.39 | | 3.55 | 3.63 | 67.09 |
| HFC 742 | 20 | 30 | 50 | 900 | 2 | | | | 15.37 | | 55 | 15 | 30 | 2.67 | | 467.74 | | 3.63 | | 3.80 | 3.89 | 71.89 |
| HFC 746 | 20 | 30 | 50 | 950 | 2 | | | | 15.37 | | 55 | 17 | 28 | 2.57 | | 371.54 | | 2.88 | | 3.09 | 3.16 | 57.10 |
| HFC 750 | 20 | 30 | 50 | 900 | 10 | | | | 15.37 | | 53 | 14 | 33 | 2.58 | | 380.19 | | 2.95 | | 3.16 | 3.24 | 58.44 |
| HFC 754 | 20 | 30 | 50 | 800 | 10 | | | | 15.37 | | 60 | 11 | 29 | 2.72 | | 524.81 | | 4.07 | | 4.37 | 4.57 | 80.66 |
| HFC 758 | 20 | 30 | 50 | 800 | 2 | | | | 15.37 | | 66 | 10 | 24 | 2.69 | | 489.78 | | 3.80 | | 4.07 | 4.27 | 75.28 |
| HFC 762 | 20 | 30 | 50 | 700 | 10 | | | | 15.37 | | 67 | 7 | 26 | 2.74 | | 549.54 | | 4.27 | | 4.68 | 4.90 | 84.46 |
| HFC 766 | 20 | 30 | 50 | 700 | 2 | | | | 15.37 | | 64 | 13 | 23 | 2.76 | | 575.44 | | 4.47 | | 4.79 | 5.01 | 88.45 |
| HFC 770 | 20 | 30 | 50 | 600 | 10 | | | | 15.37 | 17.1 | 61 | 16 | 23 | 2.78 | 2.73 | 602.56 | 541.60 | 4.68 | 4.20 | 4.90 | 5.13 | 92.61 |
| HFC 774 | 20 | 30 | 50 | 600 | 2 | | | | 15.37 | | 57 | 13 | 30 | 2.48 | | 302.00 | | 2.34 | | 2.51 | 2.57 | 46.42 |
| HFC 823 | 20 | 30 | 50 | 950 | 10 | | | | 15.37 | | 39 | 10 | 51 | 2.57 | | 371.54 | | 2.88 | | 2.75 | 2.75 | 57.61 |
| HFC 825 | 20 | 35 | 45 | 950 | 10 | | | | 15.49 | | 49 | 20 | 31 | 2.49 | | 309.03 | | 2.40 | | 2.45 | 2.51 | 47.87 |
| HFC 826 | 25 | 30 | 45 | 950 | 10 | | | | 16.28 | | | | | 2.46 | | 288.40 | | 2.24 | | 2.34 | 2.34 | 46.97 |
| HFC 827 | 15 | 35 | 50 | 950 | 10 | | | | 14.34 | | | | | 2.48 | | 302.00 | | 2.34 | | 2.45 | 2.51 | 43.32 |
| HFC 828 | 20 | 35 | 55 | 950 | 10 | | | | 15.52 | | | | | 2.36 | | 229.09 | | 1.78 | | 1.82 | 1.82 | 35.56 |
| HFC 829 | 15 | 40 | 45 | 950 | 10 | | | | 16.27 | | | | | 2.41 | | 257.04 | | 2.00 | | 2.00 | 2.04 | 41.82 |
| HFC 830 | 30 | 25 | 45 | 950 | 10 | | | | 14.33 | | | | | 2.51 | | 323.59 | | 2.51 | | 2.57 | 2.57 | 46.36 |
| HFC 831 | 15 | 25 | 60 | 950 | 10 | | | | 16.86 | | | | | 2.30 | | 199.53 | | 1.55 | | 1.58 | 1.58 | 33.64 |
| HFC 832 | 20 | 40 | 40 | 950 | 10 | | | | 14.38 | | | | | 2.42 | | 263.03 | | 2.04 | | 2.09 | 2.14 | 37.82 |
| HFC 833 | 30 | 30 | 40 | 950 | 10 | | | | 15.48 | | | | | 2.54 | | 346.74 | | 2.69 | | 2.75 | 2.82 | 53.66 |
| HFC 834 | 30 | 40 | 30 | 950 | 10 | | | | 16.85 | | | | | 2.35 | | 223.87 | | 1.74 | | 1.78 | 1.78 | 37.72 |
| HFC 835 | 10 | 40 | 50 | 950 | 10 | | | | 12.48 | | | | | 2.42 | | 263.03 | | 2.04 | | 2.09 | 2.09 | 32.81 |
| HFC 836 | 25 | 25 | 50 | 950 | 10 | | | | 16.30 | | | | | 2.40 | | 251.19 | | 1.95 | | 2.00 | 2.04 | 40.94 |
| HFC 837 | 15 | 35 | 50 | 950 | 10 | | | | 14.36 | | | | | 2.38 | | 239.88 | | 1.86 | | 1.86 | 1.86 | 34.45 |
| HFC 838 | 20 | 20 | 60 | 950 | 10 | | | | 15.54 | | | | | 2.51 | | 323.59 | | 2.51 | | 2.57 | 2.57 | 50.27 |
| HFC 839 | 25 | 40 | 35 | 950 | 10 | | | | 16.26 | | | | | 2.47 | | 295.12 | | 2.29 | | 2.34 | 2.40 | 47.98 |
| HFC 840 | 10 | 35 | 55 | 950 | 10 | | | | 12.49 | | | | | 2.46 | | 288.40 | | 2.24 | | 2.29 | 2.34 | 36.04 |
| HFC 840 | 25 | 20 | 55 | 950 | 10 | | | | 16.31 | | | | | 2.37 | | 234.42 | | 1.82 | | 1.70 | 1.74 | 38.24 |

TABLE H-continued

| | | | | | | | | | | | | | | |
|---|---|---|---|---|---|---|---|---|---|---|---|---|---|---|
| HFC 841 | 15 | 45 | 40 | 950 | 10 | 14.31 | | | | 2.55 | 354.81 | 2.75 | 2.88 | 2.88 | 50.78 |
| HFC 842 | 30 | 35 | 35 | 950 | 10 | 16.84 | | | | 2.47 | 295.12 | 2.29 | 2.40 | 2.40 | 49.69 |
| HFC 843 | 30 | 20 | 50 | 950 | 10 | 16.87 | | | | 2.32 | 208.93 | 1.62 | 1.70 | 1.74 | 35.25 |
| HFC 844 | 10 | 30 | 60 | 950 | 10 | 12.51 | | | | 2.43 | 269.15 | 2.09 | 2.09 | 2.14 | 33.68 |
| HFC 845 | 35 | 20 | 45 | 950 | 10 | 17.29 | | | | 2.38 | 239.88 | 1.86 | 1.86 | 1.86 | 29.88 |
| HFC 846 | 35 | 20 | 45 | 950 | 10 | 17.30 | | | | 2.21 | 162.18 | 1.26 | 1.26 | 1.29 | 28.04 |
| HFC 914 | 35 | 20 | 45 | 950 | 10 | 17.30 | | | | 2.41 | 257.04 | 2.00 | 2.04 | 2.09 | 44.46 |
| HFC 915 | 30 | 15 | 55 | 950 | 10 | 16.88 | | | | 2.38 | 239.88 | 1.86 | 1.91 | 1.95 | 40.50 |
| HFC 916 | 10 | 25 | 65 | 950 | 10 | 12.53 | | | | 2.48 | 302.00 | 2.34 | 2.40 | 2.45 | 37.85 |
| HFC 917 | 25 | 15 | 60 | 950 | 10 | 16.32 | | | | 2.45 | 281.84 | 2.19 | 2.29 | 2.34 | 46.01 |
| HFC 918 | 35 | 30 | 35 | 950 | 10 | 17.28 | | | | 2.43 | 269.15 | 2.09 | 2.14 | 2.19 | 46.50 |
| HFC 919 | 35 | 15 | 50 | 950 | 10 | 17.31 | | | | 2.39 | 245.47 | 1.91 | 2.00 | 2.04 | 42.49 |
| HFC 920 | 20 | 15 | 65 | 950 | 10 | 15.55 | | | | 2.49 | 309.03 | 2.40 | 2.40 | 2.40 | 48.06 |
| HFC 921 | 30 | 10 | 60 | 950 | 10 | 16.83 | | | | 2.42 | 263.03 | 2.04 | 2.09 | 2.14 | 44.25 |
| HFC 922 | 30 | 10 | 60 | 950 | 10 | 16.90 | | | | 2.55 | 353.77 | 2.75 | 2.82 | 2.88 | 59.77 |
| HFC 923 | 10 | 20 | 70 | 950 | 10 | 12.55 | | | | 2.36 | 230.35 | 1.79 | 1.84 | 1.86 | 28.92 |
| HFC 924 | 25 | 45 | 30 | 950 | 10 | 16.25 | 56 | 25 | 19 | 2.61 | 406.10 | 3.15 | 3.27 | 3.36 | 65.97 |
| HFC 925 | 15 | 50 | 35 | 950 | 10 | 14.29 | 60 | 24 | 16 | 2.59 | 387.56 | 3.01 | 3.10 | 3.17 | 55.40 |
| HFC 926 | 40 | 15 | 45 | 950 | 10 | 17.64 | | | | 2.21 | 163.97 | 1.27 | 1.32 | 1.35 | 28.92 |
| HFC 927 | 35 | 10 | 55 | 950 | 10 | 17.32 | | | | 2.30 | 198.88 | 1.54 | 1.60 | 1.64 | 34.44 |
| HFC 928 | 25 | 10 | 65 | 950 | 10 | 14.41 | | | | 2.40 | 251.83 | 1.95 | 2.01 | 2.04 | 41.14 |
| HFC 929 | 15 | 15 | 70 | 950 | 10 | 14.40 | | | | 2.53 | 340.61 | 2.64 | 2.74 | 2.81 | 49.09 |
| HFC 930 | 15 | 20 | 65 | 950 | 10 | 15.46 | | | | 2.40 | 249.58 | 1.94 | 2.01 | 2.07 | 35.93 |
| HFC 931 | 20 | 45 | 35 | 950 | 10 | 12.44 | 52 | 32 | 16 | 2.51 | 322.60 | 2.50 | 2.56 | 2.65 | 49.88 |
| HFC 932 | 10 | 50 | 40 | 950 | 10 | 17.63 | | | | 2.43 | 267.69 | 2.08 | 2.15 | 2.25 | 33.29 |
| HFC 933 | 35 | 30 | 35 | 950 | 10 | 17.27 | 53 | 28 | 19 | 2.42 | 264.95 | 2.06 | 2.14 | 2.17 | 46.71 |
| HFC 934 | 40 | 30 | 30 | 950 | 10 | 17.62 | | | | 2.55 | 356.06 | 2.76 | 2.79 | 2.86 | 61.47 |
| HFC 935 | 20 | 50 | 30 | 950 | 10 | 15.45 | | | | 2.28 | 191.13 | 1.48 | 1.52 | 1.55 | 33.68 |
| HFC 936 | 40 | 30 | 30 | 950 | 10 | 17.61 | | | | 2.52 | 329.50 | 2.56 | 2.58 | 2.61 | 50.90 |
| HFC 937 | 40 | 10 | 50 | 950 | 10 | 17.65 | | | | 2.41 | 256.17 | 1.99 | 2.02 | 2.06 | 45.11 |
| HFC 945 | 40 | 10 | 50 | 950 | 10 | 15.57 | 52 | 30 | 18 | 2.22 | 166.75 | 1.29 | 1.33 | 1.34 | 29.43 |
| HFC 946 | 30 | 45 | 25 | 950 | 10 | 16.81 | | | | 2.61 | 404.89 | 3.14 | 3.26 | 3.31 | 63.03 |
| HFC 947 | 10 | 55 | 35 | 950 | 10 | 12.42 | | | | 2.37 | 237.07 | 1.84 | 1.91 | 1.95 | 39.86 |
| HFC 948 | 45 | 15 | 40 | 950 | 10 | 17.91 | | | | 2.31 | 206.50 | 1.60 | 1.66 | 1.68 | 25.64 |
| HFC 949 | 10 | 15 | 75 | 950 | 10 | 12.57 | | | | 2.52 | 333.47 | 2.59 | 2.67 | 2.70 | 59.71 |
| HFC 950 | 25 | 50 | 25 | 950 | 10 | 16.23 | | | | 2.61 | 411.59 | 3.19 | 3.28 | 3.33 | 51.75 |
| HFC 951 | 15 | 55 | 30 | 950 | 10 | 14.28 | | | | 2.18 | 151.20 | 1.17 | 1.19 | 1.17 | 24.54 |
| HFC 952 | 45 | 10 | 45 | 950 | 10 | 17.92 | | | | 2.18 | 151.39 | 1.18 | 1.21 | 1.22 | 21.61 |
| HFC 953 | 15 | 10 | 75 | 950 | 10 | 14.43 | | | | 2.43 | 267.88 | 2.08 | 2.15 | 2.19 | 47.99 |
| HFC 954 | 20 | 55 | 25 | 950 | 10 | 15.43 | | | | 2.51 | 323.20 | 2.51 | 2.58 | 2.59 | 46.64 |
| HFC 955 | 45 | 30 | 25 | 950 | 10 | 17.88 | 52 | 30 | 18 | 2.43 | 269.74 | 2.09 | 2.17 | 2.22 | 41.63 |
| HFC 956 | 30 | 20 | 50 | 950 | 10 | 16.80 | | | | 2.23 | 169.49 | 1.32 | 1.33 | 1.33 | 30.31 |
| HFC 957 | 10 | 60 | 30 | 950 | 10 | 12.40 | | | | 2.57 | 373.71 | 2.90 | 2.97 | 3.02 | 62.79 |
| HFC 958 | 40 | 20 | 40 | 950 | 10 | 17.59 | | | | 2.48 | 301.66 | 2.34 | 2.40 | 2.43 | 37.40 |
| HFC 959 | 50 | 30 | 20 | 950 | 10 | 18.12 | | | | 2.35 | 225.00 | 1.75 | 1.76 | 1.77 | 39.58 |
| HFC 960 | 35 | 40 | 25 | 950 | 10 | 17.25 | | | | 2.23 | 169.16 | 1.31 | 1.35 | 1.36 | 30.65 |
| HFC 961 | 45 | 20 | 35 | 950 | 10 | 17.90 | | | | 2.34 | 220.72 | 1.71 | 1.78 | 1.81 | 38.08 |
| HFC 962 | 45 | 35 | 20 | 950 | 10 | 17.60 | | | | 2.12 | 132.92 | 1.03 | 1.07 | 1.08 | 23.79 |
| HFC 963 | 40 | 25 | 35 | 950 | 10 | 17.89 | | | | 2.26 | 183.67 | 1.43 | 1.47 | 1.49 | 32.33 |
| HFC 964 | 35 | 45 | 20 | 950 | 10 | 17.24 | | | | 2.24 | 172.62 | 1.34 | 1.37 | 1.38 | 30.88 |
| HFC 965 | 50 | 15 | 35 | 950 | 10 | 18.13 | | | | 2.32 | 208.17 | 1.62 | 1.65 | 1.67 | 35.90 |
| HFC 965 | 50 | 15 | 35 | 950 | 10 | 18.13 | | | | 2.05 | 112.68 | 0.87 | 0.90 | 0.87 | 20.43 |

TABLE H-continued

| | | | | | | | | | | | | | | | | | | | |
|---|---|---|---|---|---|---|---|---|---|---|---|---|---|---|---|---|---|---|---|
| HFC 966 | 50 | 10 | 40 | 950 | 10 | | 18.14 | | | | 2.13 | | 136.14 | | 1.06 | 1.07 | 1.07 | | 24.69 |
| HFC 967 | 10 | 10 | 80 | 950 | 10 | | 12.59 | | | | 2.33 | | 212.03 | | 1.65 | 1.71 | 1.74 | | 26.70 |
| HFC 971 | 25 | 55 | 20 | 950 | 10 | | 16.22 | | 54 | 15 | 2.67 | | 463.61 | | 3.60 | 3.75 | 3.84 | | 75.19 |
| HFC 972 | 15 | 60 | 25 | 950 | 10 | | 14.26 | | 52 | 15 | 2.67 | | 465.81 | | 3.62 | 3.79 | 3.88 | | 66.42 |
| HFC 973 | 45 | 35 | 20 | 950 | 10 | | 17.87 | | | | 2.18 | | 151.59 | | 1.18 | 1.19 | 1.20 | | 27.09 |
| HFC 974 | 50 | 25 | 25 | 950 | 10 | | 18.11 | | | | 2.08 | | 121.12 | | 0.94 | 0.93 | 0.92 | | 21.94 |
| HFC 975 | 40 | 45 | 15 | 950 | 10 | | 17.58 | | | | 2.37 | | 236.55 | | 1.84 | 1.86 | 1.86 | | 41.59 |
| HFC 976 | 55 | 15 | 30 | 950 | 10 | | 18.31 | | | | 2.22 | | 164.73 | | 1.28 | 1.29 | 1.29 | | 30.16 |
| HFC 977 | 55 | 10 | 35 | 950 | 10 | | 18.32 | | | | 2.03 | | 106.69 | | 0.83 | 0.82 | 0.80 | | 19.54 |
| HFC 978 | 30 | 55 | 15 | 950 | 10 | | 16.79 | | 51 | 14 | | | 356.55 | | 2.77 | 2.84 | 2.86 | | 59.86 |
| HFC 979 | 55 | 20 | 25 | 950 | 10 | | 18.30 | | 57 | 11 | 2.24 | | 172.13 | | 1.34 | 1.35 | 1.35 | | 31.50 |
| HFC 980 | 25 | 60 | 15 | 950 | 10 | | 16.21 | | 59 | 9 | 2.60 | | 398.56 | | 3.09 | 3.21 | 3.25 | | 64.59 |
| HFC 981 | 15 | 65 | 20 | 950 | 10 | | 14.24 | | | | 2.71 | | 514.45 | | 3.99 | 4.22 | 4.36 | | 73.27 |
| HFC 982 | 50 | 20 | 30 | 950 | 10 | | 18.09 | | | | 2.22 | | 164.14 | | 1.27 | 1.26 | 1.24 | | 29.70 |
| HFC 983 | 60 | 10 | 30 | 950 | 10 | | 18.47 | | 55 | 11 | 1.98 | | 95.25 | | 0.74 | 0.73 | 0.72 | | 17.60 |
| HFC 984 | 20 | 65 | 15 | 950 | 10 | | 15.40 | | | | 2.75 | | 555.94 | | 4.32 | 4.09 | 3.81 | | 85.63 |
| HFC 985 | 35 | 55 | 10 | 950 | 10 | | 17.22 | | | | 2.47 | | 291.86 | | 2.27 | 2.20 | 2.12 | | 50.27 |
| HFC 986 | 45 | 25 | 30 | 950 | 10 | | 17.85 | | | | 2.43 | | 270.14 | | 2.10 | 2.12 | 2.13 | | 48.23 |
| HFC 987 | 50 | 30 | 20 | 950 | 10 | | 18.10 | | | | 2.12 | | 132.31 | | 1.03 | 1.09 | 1.06 | | 23.95 |
| HFC 988 | 35 | 50 | 15 | 950 | 10 | | 17.23 | | | | 2.29 | | 193.27 | | 1.50 | 1.62 | 1.56 | | 33.31 |
| HFC 989 | 10 | 65 | 25 | 950 | 10 | | 12.38 | | | | 2.50 | | 313.66 | | 2.43 | 2.79 | 2.59 | | 38.83 |
| HFC 990 | 45 | 40 | 15 | 950 | 10 | | 17.86 | | | | 2.22 | | 166.25 | | 1.29 | 1.41 | 1.34 | | 29.70 |
| HFC 991 | 55 | 25 | 10 | 950 | 10 | | 18.30 | | | | 1.99 | | 96.86 | | 0.75 | 0.80 | 0.78 | | 17.72 |
| HFC 992 | 40 | 50 | 10 | 950 | 10 | | 17.57 | | 69 | 11 | 2.18 | | 151.36 | | 1.17 | 1.29 | 1.23 | | 26.60 |
| HFC 993 | 55 | 30 | 15 | 950 | 10 | | 18.29 | | | | 1.97 | | 93.36 | | 0.72 | 0.81 | 0.77 | | 17.07 |
| HFC 994 | 60 | 15 | 25 | 950 | 10 | | 18.47 | | | | 2.13 | | 136.14 | | 1.06 | 1.16 | 1.11 | | 25.14 |
| HFC 1008 | 30 | 50 | 20 | 800 | 2 | | 16.87 | | | | 2.66 | | 459.96 | | 3.57 | 3.71 | 3.82 | | 77.58 |
| HFC 1009 | 25 | 45 | 30 | 800 | 2 | | 16.35 | | | | 2.62 | | 420.16 | | 3.26 | 3.34 | 3.46 | | 68.92 |
| HFC 1010 | 20 | 10 | 70 | 800 | 2 | | 15.86 | | | | 2.49 | | 305.69 | | 2.37 | 2.45 | 2.49 | | 48.49 |
| HFC 1011 | 15 | 50 | 35 | 800 | 2 | | 14.46 | | | | 2.55 | | 354.83 | | 2.75 | 2.87 | 2.95 | | 51.31 |
| HFC 1017 | 20 | 60 | 20 | 950 | 10 | 34 | 15.42 | | 50 | 15 | 2.65 | | 448.19 | | 3.48 | 3.57 | 3.63 | | 69.10 |
| HFC 1018 | 30 | 60 | 10 | 950 | 10 | | 16.78 | 15.6 | 52 | 8 | 2.76 | 2.79 | 570.84 | 613.95 | 4.43 | 4.50 | 4.54 | 4.77 | 95.75 |
| HFC 1019 | 10 | 70 | 20 | 950 | 10 | | 12.36 | | 55 | | 2.54 | | 344.35 | | 2.67 | 2.74 | 2.80 | | 42.56 |
| HFC 1020 | 25 | 65 | 10 | 950 | 10 | | 16.19 | | 53 | | 2.65 | | 448.42 | | 3.48 | 3.55 | 3.60 | | 72.61 |
| HFC 1021 | 10 | 75 | 15 | 950 | 10 | | 12.34 | | 52 | | 2.56 | | 365.47 | | 2.84 | 2.92 | 2.97 | | 45.10 |
| HFC 1022 | 15 | 75 | 10 | 950 | 10 | | 14.21 | | | | 2.63 | | 428.34 | | 3.33 | 3.41 | 3.46 | | 60.86 |
| HFC 1023 | 5 | 80 | 15 | 950 | 10 | | 8.83 | | | | 2.51 | | 325.24 | | 2.52 | 2.51 | 2.49 | | 28.72 |
| HFC 1024 | 20 | 75 | 5 | 950 | 10 | | 15.37 | | | | 2.66 | | 453.45 | | 3.52 | 3.60 | 3.66 | | 69.71 |
| HFC 1025 | 15 | 70 | 15 | 950 | 10 | | 14.23 | | 51 | 1 | 2.51 | 2.88 | 326.11 | 764.32 | 2.53 | 2.62 | 2.68 | 5.93 | 46.39 |
| HFC 1026 | 20 | 70 | 10 | 950 | 10 | | 15.39 | | | | 2.51 | | 334.68 | | 2.60 | 2.66 | 2.73 | | 51.50 |
| HFC 1027 | 10 | 80 | 10 | 950 | 10 | | 12.32 | 14.2 | | | 2.48 | 2.86 | 300.97 | 717.56 | 2.34 | 2.44 | 2.51 | 5.57 | 37.09 |
| HFC 1028 | 15 | 80 | 5 | 950 | 10 | | 14.19 | | | | 2.52 | | 334.96 | | 2.60 | 2.68 | 2.74 | | 47.54 |
| HFC 1081 | 25 | 65 | 10 | 700 | 6 | | 16.20 | | | 4 | 2.77 | | 587.17 | | 4.56 | 4.54 | 4.57 | | 95.12 |
| HFC 1082 | 25 | 65 | 10 | 800 | 6 | 29 | 16.20 | 15.8 | 65 | 31 | 2.87 | | 745.45 | | 5.79 | 5.94 | 6.03 | | 120.76 |
| HFC 1083 | 25 | 65 | 10 | 900 | 6 | | 16.20 | | | | 2.74 | | 555.64 | | 4.31 | 4.45 | 4.55 | | 90.01 |
| HFC 1084 | 25 | 65 | 10 | 800 | 2 | | 16.20 | | | | 2.69 | | 487.66 | | 3.79 | 3.93 | 4.02 | | 79.00 |
| HFC 1085 | 25 | 65 | 10 | 700 | 10 | 29 | 16.20 | | 61 | | 2.80 | | 628.97 | | 4.88 | 4.90 | 4.97 | | 101.89 |
| HFC 1086 | 25 | 65 | 10 | 800 | 10 | | 16.20 | | | | 2.47 | | 295.80 | | 2.30 | 2.52 | 2.67 | | 47.92 |

TABLE H-continued

| Powder Name | Original Catalyst Comp. (at %) | | | Max Alloying Temp for a duration | | Measured Catalyst Comp. after washing (at %) | | | Original Pt loading (wt %) | Measured Catalyst Comp. after performing activity tests | | | Target Log (Pt Mass Activity) @ +0.15 V MMS | Mass Log (Pt Mass Activity) @ +0.15 V MMS | Target Pt Mass Activity [mA/mg Pt] @ +0.15 V MMS | Target Activity [mA/mg Pt] @ +0.15 V MMS | Relative perf. @ +0.15 V MMS (SCAN 1) | Target Relative perf. @ +0.15 V MMS | Target Relative perf. @ +0.15 V MMS (SCAN 2) | Mass Relative perf. @ +0.15 V MMS (SCAN 3) | Catalyst Activity [mA/mg catalyst] @ +0.8 V/RHE |
|---|---|---|---|---|---|---|---|---|---|---|---|---|---|---|---|---|---|---|---|---|---|
| HFC 1087 | 25 | 65 | 10 | 900 | 10 | | | | 16.20 | | | | 2.51 | | 326.58 | | 2.54 | | 2.78 | 2.95 | 52.91 |
| HFC 1088 | 25 | 65 | 10 | 900 | 2 | | | | 16.20 | | | | 2.53 | | 335.28 | | 2.60 | | 2.85 | 3.05 | 54.32 |
| HFC 1090 | 25 | 55 | 20 | 800 | 6 | | | | 16.22 | | | | 2.68 | | 477.01 | | 3.70 | | 3.46 | 3.65 | 77.37 |
| HFC 1091 | 15 | 60 | 25 | 800 | 6 | | | | 14.26 | | | | 2.68 | | 480.87 | | 3.73 | | 3.50 | 3.69 | 68.57 |
| HFC 1092 | 20 | 60 | 20 | 800 | 6 | | | | 15.42 | | | | 2.76 | | 569.05 | | 4.42 | | 3.77 | 4.30 | 87.73 |
| HFC 1093 | 30 | 60 | 10 | 800 | 6 | 33 | 57 | 10 | 16.78 | 69 | 22 | 9 | 2.76 | | 576.65 | | 4.42 | | 4.25 | 4.44 | 96.75 |
| HFC 1094 | 25 | 65 | 10 | 800 | 6 | | | | 16.19 | 63 | 29 | 8 | 2.76 | | 569.24 | | 4.48 | | 4.25 | 4.44 | 92.18 |
| HFC 1095 | 20 | 70 | 10 | 800 | 6 | | | | 15.39 | 70 | 25 | 5 | 2.68 | | 473.50 | | 3.68 | | 3.50 | 3.67 | 72.86 |
| HFC 1096 | 25 | 70 | 5 | 800 | 6 | | | | 16.18 | | | | 2.74 | | 549.76 | | 4.27 | | 4.15 | 4.21 | 88.95 |
| HFC 1097 | 30 | 65 | 5 | 800 | 6 | | | | 16.77 | 60 | 40 | — | 2.64 | | 435.59 | | 3.38 | | 3.21 | 3.37 | 73.03 |
| HFC 1098 | 15 | 65 | 20 | 800 | 6 | | | | 14.24 | | | | 2.71 | | 516.50 | | 4.01 | | 4.16 | 4.27 | 73.56 |
| HFC 1099 | 20 | 65 | 15 | 800 | 6 | | | | 15.40 | 59 | 30 | 11 | 2.72 | | 523.80 | | 4.07 | | 4.21 | 4.28 | 80.68 |
| HFC 1100 | 35 | 60 | 5 | 800 | 6 | | | | 17.21 | | | | 2.60 | | 393.78 | | 3.06 | | 3.19 | 3.28 | 67.78 |
| HFC 1101 | 20 | 75 | 5 | 800 | 6 | | | | 15.37 | | | | 2.72 | | 523.54 | | 4.06 | | 4.19 | 4.27 | 80.48 |
| HFC 1116 | 25 | 65 | 10 | 800 | 6 | | 16.4 | | 16.20 | | | | 2.80 | | 630.94 | | 4.90 | | 4.70 | 4.80 | 102.19 |
| HFC 1117 | 25 | 65 | 10 | 700 | 10 | | | | 16.20 | 61 | 30 | 9 | 2.85 | | 707.95 | 589.65 | 5.50 | 4.58 | 5.30 | 5.50 | 114.06 |
| HFC 1118 | 25 | 65 | 10 | 800 | 10 | | | | 16.20 | 59 | 32 | 9 | 2.78 | | 602.56 | | 4.68 | | 4.50 | 4.70 | 97.47 |
| HFC 1119 | 25 | 65 | 10 | 900 | 2 | | | | 16.20 | | | | 2.77 | | 592.24 | | 4.60 | | 4.55 | 4.63 | 95.94 |
| HFC 1122 | 25 | 65 | 10 | 800 | 6 | 57 | 41 | 2 | 16.20 | 70 | 27 | 3 | 2.61 | | 407.72 | | 3.16 | | 3.00 | 3.26 | 66.05 |
| HFC 1123 | 25 | 65 | 10 | 800 | 6 | 48 | 48 | 4 | 16.20 | 68 | 30 | 2 | 2.57 | | 373.29 | | 2.90 | | 2.73 | 2.95 | 60.47 |
| HFC 1186 | 25 | 65 | 10 | 800 | 6 | 55 | 37 | 9 | 16.20 | 63 | 31 | 6 | 2.63 | | 422.74 | | 3.28 | | 3.34 | 3.37 | 68.48 |
| HFC 1187 | 25 | 65 | 10 | 800 | 6 | 52 | 41 | 8 | 16.20 | 65 | 29 | 6 | 2.56 | | 360.61 | | 2.80 | | 2.88 | 2.94 | 58.42 |
| HFC 1188 | 25 | 65 | 10 | 800 | 6 | 52 | 43 | 6 | 16.20 | 69 | 28 | 3 | 2.55 | | 354.29 | | 2.75 | | 2.83 | 2.90 | 57.39 |
| HFC 1581 | 25 | 65 | 10 | 800 | 6 | 54 | 37 | 9 | 16.20 | 64 | 30 | 6 | 2.63 | | 430.99 | | 3.35 | | 3.35 | 3.27 | 69.78 |

Example 4

Evaluation of Catalytic Activity of Supported Catalysts

The supported alloy catalysts set forth in Table H and formed according to Example 3 were subjected to electrochemical measurements to evaluate their activities. For the evaluation, the supported catalysts were applied to a rotating disk electrode (RDE) as is commonly used in the art (see, Rotating Disk Electrode Measurements on the CO Tolerance of a High-surface Area Pt/Vulcan Carbon Fuel Cell Electrocatalyst, Schmidt et al., Journal of the Electrochemical Society (1999), 146(4), 1296-1304; and, Characterization of High Surface-Area Electrocatalysts using a Rotating Disk Electrode Configuration, Schmidt et al., Journal of the Electrochemical Society (1998), 145(7), 2354-2358). Rotating disk electrodes are a relatively fast and simple screening tool for evaluating supported catalysts with respect to their intrinsic electrolytic activity for oxygen reduction (e.g., the cathodic reaction of a fuel cell).

The rotating disk electrodes were prepared by depositing an aqueous-based ink that comprises the supported catalyst and a NAFION solution on a glassy carbon disk. The concentration of catalyst powder in the NAFION solution was about 1 mg/ml. The NAFION solution comprised the perfluorinated ion-exchange resin, lower aliphatic alcohols and water, wherein the concentration of resin was about 5 percent by weight. The NAFION solution is commercially available from ALDRICH as product number 27, 470-4. The glassy carbon electrodes were 5 mm in diameter and were polished to a mirror finish. Glassy carbon electrodes are commercially available, for example, from Pine Instrument Company of Grove City, Pa. For each electrode, an aliquot of 10 µL of the catalyst suspension was deposited on to the glassy carbon disk and allowed to dry at a temperature between about 60 and 70° C. The resulting layer of NAFION and catalyst was less than about 0.2 µm thick. This method produced slightly different platinum loadings for each electrode made with a particular suspension, but the variation was determined to be less than about 10 percent by weight.

After being dried, each rotating disk electrode was immersed into an electrochemical cell comprising an aqueous 0.5 M $H_2SO_4$ electrolyte solution maintained at room temperature. Before performing any measurements, the electrochemical cell was purged of oxygen by bubbling argon through the electrolyte for about 20 minutes. All measurements were taken while rotating the electrode at about 2000 rpm, and the measured current densities were normalized either to the glassy carbon substrate area or to the platinum loading on the electrode. Two groups of tests were performed to screen the activity of the supported catalysts. The first group of tests comprised cyclic voltammetric measurements while purging the electrolyte with argon. Specifically, the first group comprised:

a. two consecutive potential sweeps starting from OCP to about +0.35V then to about −0.65V and back to OCP at a rate of about 50 mV/s;
  b. two hundred consecutive potential sweeps starting from OCP to about +0.35V then to about −0.65V and back to OCP at a rate of about 200 mV/s; and
  c. two consecutive potential sweeps starting from OCP to about +0.35V then to about −0.65V and back to OCP at a rate of about 50 mV/s.

The second test comprised purging with oxygen for about 15 minutes followed by a potential sweep test for oxygen reduction while continuing to purge the electrolyte with oxygen. Specifically, potential sweeps from about −0.45 V to +0.35 V were performed at a rate of about 5 mV/s to evaluate the initial activity of the catalyst as a function of potential and to create a geometric current density plot. The catalysts were evaluated by comparing the diffusion corrected activity at 0.15 V. All the foregoing test voltages are with reference to a mercury/mercury sulfate electrode. Also, it is to be noted that the oxygen reduction measurements for a glassy carbon RDE without a catalyst did not show any appreciable activity within the potential window.

The above-described supported catalyst compositions were evaluated in accordance with the above-described method and the results are set forth in Table H. It is to be noted from the results presented therein that essentially all of the carbon supported catalyst compositions exhibited an oxygen reduction activity which exceeded, for example, the carbon supported platinum standard (see, e.g., samples 770, 619, 1018, 1081, 1082 and 1085).

The results of the evaluation indicate, among other things, that a supported catalyst of the present invention may be produced using different process temperatures and durations. It is to be noted, however, that it may take numerous iterations to develop a set of parameters for producing a particular catalyst composition. Also evidenced by the data is that activity may be adjusted by changes in the processing conditions.

Further, without being held to a particular theory, it is presently believed that differences in activity for similar catalyst compositions may be due to several factors, such as homogeneity (e.g., an alloy, as defined herein, may have regions in which the constituent atoms show a presence or lack of order, i.e., regions of solid solution within an ordered lattice, or some type of superstructure), changes in the lattice parameter due to changes in the average size of component atoms, changes in particle size, and changes in crystallographic structure/symmetry. The ramifications of synthesis, structure and symmetry changes are often difficult to predict. For example, within the Pt—Cu or Pt—Ni system, extended solid solutions are expected to form with little to any change in crystallographic symmetry. In the ternary Pt—Cu—Ni system similar behavior is expected; however, subtle differences in metal radius or electronic characteristics, as well as exact synthetic conditions, make it difficult to predict exactly what may occur. Without being held to a particular theory, the possibility exists that as the relative ratio of copper and nickel to platinum increases, a solid solution first occurs (i.e., Cu/Ni and Pt may mix randomly within some concentration limits, or under some specific synthesis conditions), and out of this solid solution an ordered phase may gradually crystallize, e.g., $Pt_3(Cu/Ni)$, only to return to a solid solution (disordered alloy), and again back to an ordered phase as the formula Pt(Ni/Cu) is achieved.

Symmetry changes (e.g., those associated with the changes from a cubic face centered structure to a tetragonal or hexagonal structure, for example) may result in significant changes in the X-ray diffraction pattern. These changes may also be accompanied by more subtle changes in lattice parameters that may be indicative of the resulting changes in the size of the respective metal constituents. For example, the 12-coordinate metallic radii of platinum, copper and nickel are 1.39 Å, 1.28 Å, and 1.25 Å, respectively, and as one metal is substituted for another, the average metal radius, and consequently the observed lattice parameter may be expected to shrink or expand accordingly. The average radius may thus be used as an indicator of lattice changes as a function of stoichiometry, or alternatively, as an indicator of stoichiometry based on observed lattice parameters. It should be noted, however, that while average radii may be useful as a general rule, experimental results should be expected to conform only in a general manner because local ordering, significant size disparity between atoms, significant changes in symmetry, and other factors may produce values that are inconsistent with expectations. Occasionally, however, the use of alternative metallic radii may be informative. One such alternative radius concept approximates metal radii using known crystallographically ordered Pt-based alloys, such as PtNi or PtCu (in both cases, cubic symmetry is maintained), instead of pure metals (see, for example, Pearson's Handbook, P. Villars, ed., ASM International, 1997). In this case, the same close-packed geometric arguments are relevant, with the exception that the lattice parameter of the ordered metal alloy is used in conjunction with the accepted 12-coordinate metallic radius of platinum, supra. Using these concepts, effective radii of copper and nickel are 1.284 Å and 1.265 Å, respectively.

An interpretation of XRD analyses for a few of the foregoing supported catalysts is set forth below. It is to be noted, however, that interpretation of XRD analyses can be subjective, and therefore, the following conclusions are not intended to be limiting.

$Pt_{20}Cu_{30}Ni_{50}$ (see, for example, sample HFC 649): The lattice constant based on the targeted stoichiometry was predicted to decrease by approximately 6.6% as compared to pure platinum. In fact, XRD measurements of HFC 649 indicated a decrease of 6.8% as compared to platinum. In other words, the measured lattice constant was substantially the same as the predicted lattice constant. Sample HFC 649 appeared to be a solid solution; no measurable impurities were seen by XRD. The particle size was estimated to be approximately 4.6 nm, using the known Scherrer/Warren equation.

$Pt_{25}Cu_{65}Ni_{10}$ (see, for example, HFC 1082): The lattice constant based on the targeted stoichiometry was predicted to decrease by approximately 5.7% as compared to pure platinum. In fact, XRD measurements of HFC 1082 indicated a decrease of 6.0% as compared to platinum. In other words, the measured lattice constant was substantially the same as the predicted lattice constant. Sample HFC 1082 also appeared to be a solid solution; no measurable impurities were seen by XRD. The particle size was estimated to be approximately 4.2 nm, using the known Scherrer/Warren equation.

$Pt_{25}Cu_{65}Ni_{10}$ (see, for example, HFC 1581): The lattice constant based on the targeted stoichiometry was predicted to decrease by approximately 5.7% as compared to pure platinum. In fact, XRD measurements of HFC 1581, as synthesized, indicated a decrease of 5.9% as compared to platinum. In other words, the measured lattice constant was substantially the same as the predicted lattice constant. Sample HFC 1581, as synthesized, appeared to be a solid solution and no measurable impurities were seen by XRD. The particle size was estimated to be approximately 3.7 nm, using the known Scherrer/Warren equation.

Sample HFC 1581 was washed according to the method described elsewhere herein. The washed composition was determined to be $Pt_{54}Cu_{37}Ni_9$. The lattice constant based on the washed stoichiometry was predicted to decrease by approximately 3.5% as compared to pure platinum. However, XRD measurements of HFC 1581, after washing, indicated a decrease of 4.3% as compared to platinum. In other words, the measured lattice constant was clearly smaller than the predicted lattice constant. Sample HFC 1581, as washed, continued to display the XRD characteristics of a solid solution and no measurable impurities were detected. The particle size was estimated to be approximately 2.7 nm, using the known Scherrer/Warren equation.

In view of the foregoing, for a particular catalyst composition, a determination of the optimum conditions is preferred to produce the highest activity for that particular composition. In fact, for certain catalyst compositions, different structural characteristics may define what exactly is described as a good catalyst. These characteristics may include differences in the composition (as viewed by lattice parameter), crystallinity, crystallographic ordering and/or particle size. These characteristics are not necessarily predictable and may depend on a complex interplay between starting materials, synthesis method, synthesis temperature and composition. For example, the starting materials used to synthesize the catalyst alloy may play a role in the activity of the synthesized catalyst alloy. Specifically, using something other than a metal nitrate salt solution to supply the metal atoms may result in different activities. Additionally, alternative Pt sources may be employed. Freeze-drying and heat treatment parameters such as atmosphere, time, temperature, etc. may also require optimization. This optimization may be compositionally dependent. Additionally, this optimization may involve balancing competing phenomena. For example, increasing the heat treatment temperature is generally known to improve the reduction of a metal salt to a metal, which typically increases activity; however, this also tends to increase the size of the catalyst alloy particle and decrease surface area, which decreases electrocatalytic activity.

Example 5

Washing of Catalyst Composition Precursor 100 mg of a powder catalyst composition precursor (e.g., Sample HFC 1581, $Pt_{25}Cu_{65}Ni_{10}$) was placed into a 20 ml glass vial, followed by the slow addition (over a 5 to 10 second period of time, in order to allow sufficient time for the acid to wet the powder) of 15 ml of a 1 M $HClO_4$ acid solution. This mixture was placed on a hot plate which had been previously calibrated to raise the temperature of the mixture to 90-95° C. (the vial in which the mixture had been placed being capped, but not tightly so that any boiling which occurred took place without a build-up of pressure therein).

After 1 hour under at these conditions, the mixture was filtered through filter paper, the filtrate having a pale blue color which indicated the presence of Cu and/or Ni ions therein. The filtered cake was washed repeatedly with a large excess of water.

Following this initial, single wash cycle, the isolated filter cake was put back into a new vial with another 15 ml of 1 M $HClO_4$ acid solution. After enough stirring was performed to break apart the filter cake, the mixture was put back on the hot plate at 90-95° C. for 1 hour. The mixture was then filtered and washed with water once again. The resulting cake was dried at 90° C. for 48 hours.

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

When introducing elements of the present invention or an embodiment thereof, the articles "a", "an", "the" and "said" are intended to mean that there are one or more of the elements. The terms "comprising", "including" and "having" are intended to be inclusive and mean that there may be additional elements other than the listed elements.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. A composition consisting essentially of platinum, copper and nickel wherein the sum of the concentrations of platinum, copper and nickel is greater than 95 atomic percent, and further wherein the concentration of platinum is greater than 50 atomic percent and the concentration of nickel is greater than 25 atomic percent.

2. The composition of claim 1 wherein the composition has an observed lattice constant that is less than a lattice constant as calculated in accordance with Vegard's Law.

3. The composition of claim 1 wherein the concentration of platinum is at least 55 atomic percent but less than about 75 atomic percent.

4. The composition of claim 1 wherein (i) the concentration of platinum is greater than about 60 atomic percent and less than about 70 atomic percent.

5. The composition of claim 1 wherein the sum of the concentrations of copper and nickel is less than about 45 atomic percent.

6. The composition of claim 1 wherein the concentration of copper is greater than about 1 atomic percent.

7. The composition of claim 1 wherein the platinum, copper or nickel present therein is in the metallic oxidation state.

8. A composition consisting essentially of an alloy of platinum, copper and nickel wherein the sum of the concentrations of platinum, copper and nickel is greater than 95 atomic percent, and further wherein the concentration of platinum is greater than 50 atomic percent and the concentration of nickel is greater than 25 atomic percent.

9. A composition consisting essentially of platinum, copper and nickel, wherein the sum of the concentrations of platinum, copper and nickel is greater than 95 atomic percent, and further wherein the concentration of copper is greater than 25 atomic percent and the concentration of nickel is greater than 25 atomic percent.

10. The composition of claim 9 wherein the composition has an observed lattice constant that is less than a lattice constant as calculated in accordance with Vegard's Law.

11. The composition of claim 9 wherein the concentration of platinum is at least about 55 atomic percent.

12. The composition of claim 9 wherein the concentration of copper is greater than 25 and less than about 45 atomic percent.

13. The composition of claim 9 wherein the platinum, copper or nickel present therein is in the metallic oxidation state.

14. The composition of claim 9 wherein the concentration of platinum is greater than about 1 atomic percent.

15. A composition consisting essentially of an alloy of platinum, copper and nickel, wherein the sum of the concentrations of platinum, copper and nickel is greater than 95 atomic percent, and further wherein the concentration of copper is greater than 25 atomic percent and the concentration of nickel is greater than 25 atomic percent.

16. A precursor catalyst composition consisting essentially of platinum, copper and nickel, wherein the concentration of platinum in the catalyst composition is less than 45 atomic percent and the sum of the concentrations of platinum, copper and nickel therein is greater than 95 atomic percent and further wherein the concentration of copper is greater than 10 atomic percent and less than 75 atomic percent and the concentration of nickel is greater than 10 atomic percent and less than 75 atomic percent.

17. The precursor of claim 16 wherein the concentration of platinum is greater than about 10 and less than 45 atomic percent.

18. The precursor of claim 16 wherein the concentration of platinum is greater than about 20 and less than about 30 atomic percent, the concentration of copper is greater than about 30 and less than about 65 atomic percent, and the concentration of nickel is greater than about 10 and less than about 50 atomic percent.

19. The precursor of claim 16 wherein the concentration of platinum is greater than about 20 and less than about 25 atomic percent, the concentration of copper is greater than about 60 and less than about 65 atomic percent, and the concentration of nickel is greater than about 10 and less than about 20 atomic percent.

20. The precursor of claim 16 wherein the concentration of copper is greater than about 1 atomic percent, the concentration of nickel is greater than about 1 atomic percent, and the concentration of platinum is greater than about 1 atomic percent.

* * * * *